US008872786B2

(12) United States Patent
Matsuo

(10) Patent No.: US 8,872,786 B2
(45) Date of Patent: Oct. 28, 2014

(54) CAPACITIVE INPUT DEVICE, DISPLAY DEVICE WITH INPUT FUNCTION, AND ELECTRONIC APPARATUS

(75) Inventor: Mutsumi Matsuo, Azumino (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 1030 days.

(21) Appl. No.: 12/362,531

(22) Filed: Jan. 30, 2009

(65) Prior Publication Data

US 2009/0244028 A1  Oct. 1, 2009

(30) Foreign Application Priority Data

Mar. 25, 2008 (JP) ................................ 2008-077383
Nov. 26, 2008 (JP) ................................ 2008-300513

(51) Int. Cl.
*G06F 3/045* (2006.01)
*G06F 3/044* (2006.01)
*G02B 5/28* (2006.01)

(52) U.S. Cl.
CPC ...... *G06F 3/044* (2013.01); *G06F 2203/04111* (2013.01); *G02B 5/285* (2013.01)
USPC ....................................................... 345/174

(58) Field of Classification Search
CPC ........................................... G06F 2203/04111
USPC ....................................................... 345/174
See application file for complete search history.

(56) References Cited

U.S. PATENT DOCUMENTS

| 4,639,089 | A | * | 1/1987 | Okada et al. ................... 349/156 |
| 5,400,179 | A | * | 3/1995 | Ito .................................. 359/588 |
| 5,440,080 | A | * | 8/1995 | Nagaoka et al. ............ 178/19.01 |
| 5,543,590 | A | * | 8/1996 | Gillespie et al. ............ 178/18.06 |
| 5,579,159 | A | * | 11/1996 | Ito .............................. 359/485.03 |
| 5,844,506 | A | * | 12/1998 | Binstead ........................ 341/34 |
| 6,473,235 | B2 | * | 10/2002 | Toyoshima et al. ............ 359/585 |
| 6,507,337 | B1 | * | 1/2003 | Sato et al. ...................... 345/173 |
| 6,809,473 | B2 | * | 10/2004 | Ueda et al. ..................... 313/504 |
| 7,889,284 | B1 | * | 2/2011 | Nemeth et al. ................ 349/12 |

(Continued)

FOREIGN PATENT DOCUMENTS

JP 58-166437 1/1983
JP 58-166437 10/1983

(Continued)

OTHER PUBLICATIONS

JP Office Action for corresponding Japanese Patent Application No. 2010-183030 dated Aug. 9, 2011.

(Continued)

*Primary Examiner* — Dorothy Harris
(74) *Attorney, Agent, or Firm* — K & L Gates LLP

(57) ABSTRACT

A capacitive input device includes a light-transmitting substrate, a multilayer film formed on one of the surfaces of the light-transmitting substrate and including a plurality of light-transmitting thin films which have different refractive indexes and one of which is a niobium oxide film, a plurality of first light-transmitting electrodes formed on the multilayer film in an input region of the light-transmitting substrate to extend in a first direction, and a plurality of second light-transmitting electrodes formed on the multilayer film in the input region of the light-transmitting substrate to extend in a second direction crossing the first direction.

12 Claims, 11 Drawing Sheets

(56) References Cited

U.S. PATENT DOCUMENTS

| | | | |
|---|---|---|---|
| 2003/0082314 A1* | 5/2003 | Higashi et al. | 428/1.31 |
| 2004/0080830 A1* | 4/2004 | Leu et al. | 359/558 |
| 2004/0095645 A1* | 5/2004 | Pellicori et al. | 359/584 |
| 2004/0246238 A1* | 12/2004 | Oya et al. | 345/173 |
| 2005/0030048 A1* | 2/2005 | Bolender et al. | 324/661 |
| 2005/0083307 A1* | 4/2005 | Aufderheide et al. | 345/173 |
| 2006/0017707 A1* | 1/2006 | Fukui et al. | 345/173 |
| 2006/0132465 A1* | 6/2006 | Nishikawa et al. | 345/174 |
| 2006/0214925 A1* | 9/2006 | Taninaka et al. | 345/173 |
| 2007/0165006 A1* | 7/2007 | Sato et al. | 345/174 |
| 2007/0240914 A1* | 10/2007 | Lai et al. | 178/18.06 |
| 2007/0242054 A1* | 10/2007 | Chang et al. | 345/173 |
| 2008/0264699 A1* | 10/2008 | Chang et al. | 178/18.01 |
| 2009/0140990 A1* | 6/2009 | Chang et al. | 345/173 |
| 2009/0219258 A1* | 9/2009 | Geaghan et al. | 345/173 |

FOREIGN PATENT DOCUMENTS

| | | |
|---|---|---|
| JP | 2003-251751 | 9/2003 |
| JP | 2006-031590 | 2/2006 |
| JP | 2007-508639 | 4/2007 |
| JP | 2007-122326 | 5/2007 |

OTHER PUBLICATIONS

Japanese Office Action for corresponding JP2008-300513 issued on May 18, 2010.

* cited by examiner

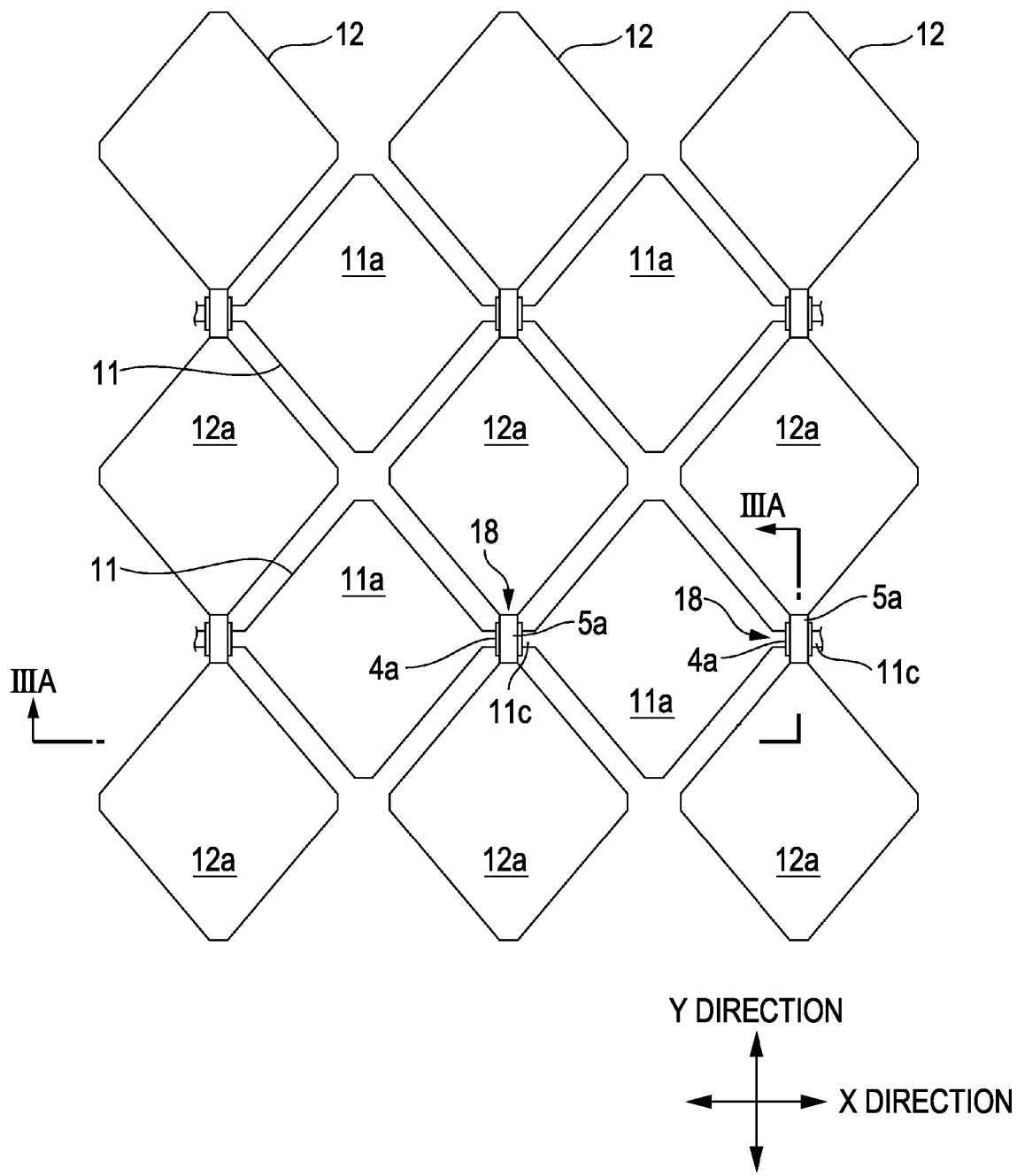

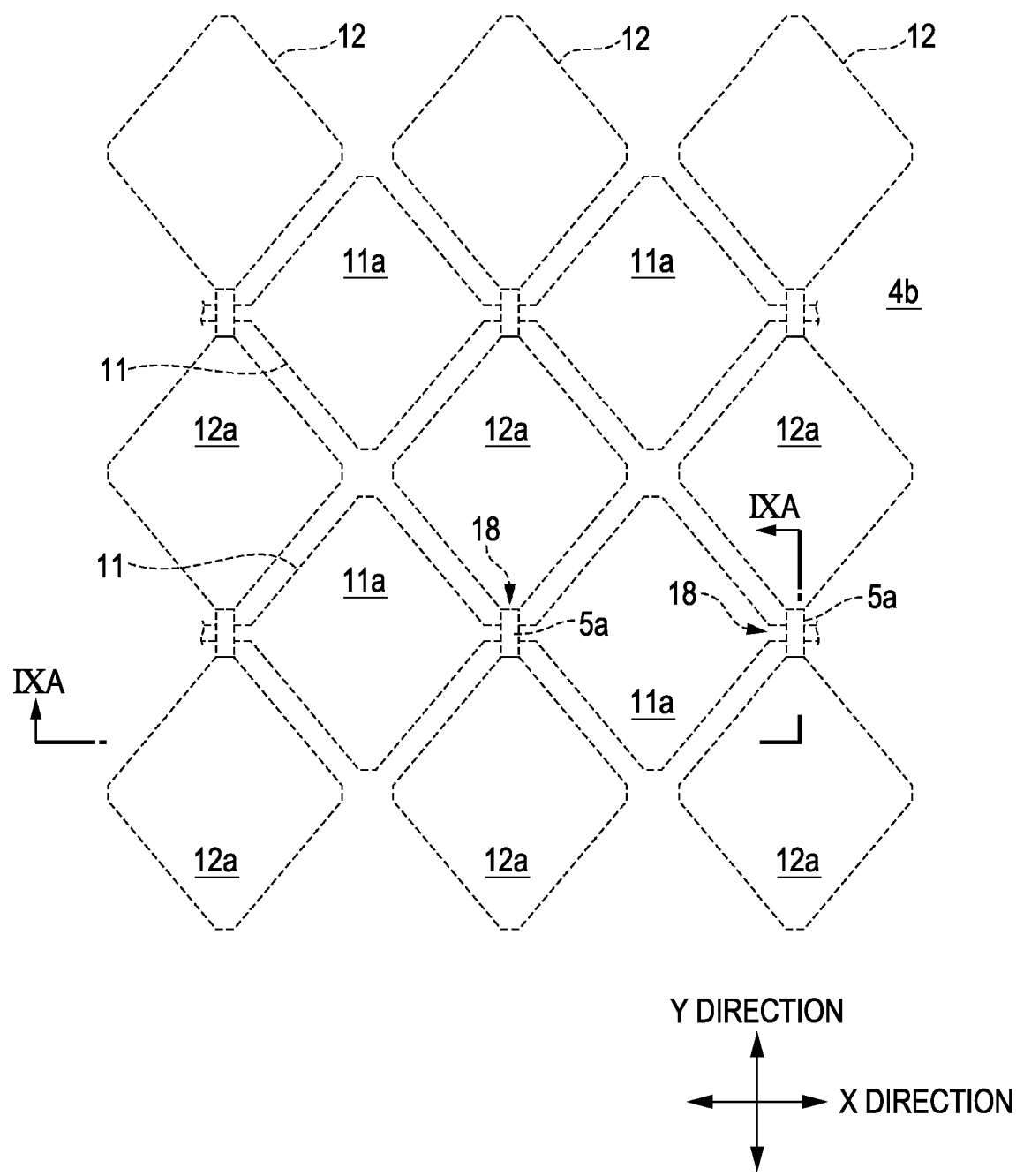

CAPACITIVE INPUT DEVICE, DISPLAY DEVICE WITH INPUT FUNCTION, AND ELECTRONIC APPARATUS

The entire disclosure of Japanese Patent Application Nos. 2008-077383, filed Mar. 25, 2008 and 2008-300513, filed Nov. 26, 2008 are expressly incorporated by reference herein.

BACKGROUND

1. Technical Field

The present invention relates to a capacitive input device capable of detecting a finger touch position as a change in capacitance, a display device with an input function, and an electronic apparatus.

2. Related Art

In electronic apparatuses such as a cellular phone, a car navigation system, a personal computer, a ticket-vending machine, a banking terminal, and the like, a tablet-shaped input device has recently been disposed on a surface of a liquid crystal device to permit information according to an indicative image displayed in an image display region of the liquid crystal device to be input by touching, with a finger, a display position of the inductive image while referring to the indicative image.

Such an input device (touch panel) is a resistance film type, a capacitive type, or the like. However, a resistance film-type input device has the disadvantages of a narrow operating temperature range and weakness to changes with time because in a two-layer structure including a film and a glass, the film is pressed to cause short-circuiting.

In contrast, a capacitive input device has an advantage that a light-transmitting conductive film may be formed on a substrate. Such a capacitive input device is, for example, a type in which electrodes are extended in directions crossing each other so that when the device is touched with a finger or the like, a change in capacitance between the electrodes is detected to detect an input position (for example, Japanese Unexamined Patent Application Publication No. 2007-122326).

Alternatively, the capacitive input device is a type in which alternating currents with the same phase and same voltage are applied to both ends of a light-transmitting conductive film so that when a finger comes in contact with or close to the device, a weak current flowing due to the formation of a capacitor is detected to detect an input position.

In the capacitive input device, for example, a substrate and an electrode which are excellent in light transmittance are used for visualizing an image displayed on a liquid crystal device from the input side of the input device. However, when a large difference in reflectance occurs between a region where a light-transmitting electrode or the like is formed and a region where a light-transmitting electrode or the like is not formed, the presence of the light-transmitting electrode undesirably becomes noticeable. Also, when first and second light-transmitting electrodes are formed on the front and back surfaces of a light-transmitting substrate, a region where the first light-transmitting electrode is formed, a region where the second light-transmitting electrode is formed, and a region where such a light-transmitting electrode is not formed have significant differences in optical configuration because the light-transmitting substrate is interposed between the first and second light-transmitting electrodes, resulting in a problem that a large difference in reflectance occurs between these regions, and the presence of the light-transmitting electrodes becomes noticeable.

Further, even when a first and second light-transmitting electrodes are formed on the same surface of a light-transmitting substrate, a region where the light-transmitting electrodes are formed and a region where the light-transmitting electrodes are not formed have a significant difference in reflectance because of a large difference in refractive index between a glass substrate generally used as the light-transmitting substrate and an ITO film (Indium Tin Oxide) generally used as the light-transmitting electrodes, and thus the presence of the light-transmitting electrodes undesirably becomes noticeable.

SUMMARY

An advantage of some aspects of the invention is that the invention provides a capacitive input device capable of making a light-transmitting substrate unnoticeable while simplifying a manufacturing process, a display device provided with an input function, and an electronic apparatus.

A capacitive input device of the present invention includes a light-transmitting substrate, a multi-layer film formed on one of the surfaces of the light-transmitting substrate and including a plurality of light-transmitting thin films which have different refractive indexes and one of which is a niobium oxide film, a plurality of first light-transmitting electrodes formed on the multi-layer film in an input region of the light-transmitting substrate to extend in a first direction, and a plurality of second light-transmitting electrodes formed on the multi-layer film in the input region of the light-transmitting substrate to extend in a second direction crossing the first direction.

In the capacitive input device of the present invention, the first light-transmitting electrodes and the second light-transmitting electrodes are formed on the same surface of the light-transmitting substrate, and thus the light-transmitting substrate is not interposed between the first light-transmitting electrodes and the second light-transmitting electrodes. By using an anti-reflective technique, it is possible to decrease a difference in reflectance between a region where the first light-transmitting electrodes are formed, a region where the second light-transmitting electrodes are formed, and a region where these light-transmitting electrodes are not formed, thereby easily making the light-transmitting electrodes unnoticeable and simplifying the manufacturing process. Also, in the present invention, as the anti-reflective technique, the multi-layer film including light-transmitting thin films having different refractive indexes and including the niobium oxide film is formed between the first light-transmitting electrodes and the light-transmitting substrate and between the second light-transmitting electrodes and the light-transmitting substrate, and thus a difference in reflectance between the region where the light-transmitting electrodes are formed and the region where the light-transmitting electrodes are not formed is reduced by antiphase light, thereby easily making the light-transmitting electrodes unnoticeable. In other words, when light is transmitted through an interface between media with different refractive indexes, light is reflected at the interface between the media. Therefore, when the light-transmitting electrodes are formed on the light-transmitting substrate, there are an interface between a medium layer on the input surface side of the light-transmitting electrodes and the light-transmitting electrodes and an interface between the light-transmitting electrodes and the light-transmitting substrate, and thus a difference in reflectance occurs between the region where the light-transmitting electrodes are formed and the region where light-transmitting electrodes are not formed, thereby visualizing the light-transmitting electrodes. However, when the phases of light reflected at the interfaces are canceled by reversal using the multilayer film, a difference in reflectance between the region where the light-transmitting electrodes are formed and the region where light-transmitting electrodes are not formed may be removed, thereby making the presence of the light-transmitting electrodes unnoticeable. In the present invention, the multilayer film includes the niobium oxide film having a high refractive index, and thus when a material having a high refractive index, such as an ITO film, is used for the light-transmitting electrodes, the light-transmitting electrodes can be made unnoticeable. Also, ITO films with a large thickness may be used for the light-transmitting electrodes, thereby decreasing the resistance of the light-transmitting electrodes.

In the present invention, it is preferred that the first light-transmitting electrodes and the second light-transmitting electrodes are formed on the multilayer film with the same configuration using the same material, and at each of the intersections between the first light-transmitting electrodes and the second light-transmitting electrodes, either the first or second light-transmitting electrodes are continuous, while the other electrodes are discontinuous. Also, it is preferred that a light-transmitting interlayer insulation film is formed on the light-transmitting electrodes continuous at each of the intersections, and a light-transmitting relay electrode is formed on the interlayer insulation film in order to electrically connect the other light-transmitting electrodes discontinuous at each intersection. In this configuration, the first and second light-transmitting electrodes may be formed by the same process because these electrodes have the same configuration, thereby simplifying the manufacturing process. In addition, when the first and second light-transmitting electrodes are formed between different layers, the film structure at each intersection is different from that of the first and second light-transmitting electrodes, and thus the intersections become noticeable even if the light-transmitting electrodes are formed so as to decrease a difference in reflectance between the region where the light-transmitting electrodes are formed and the region where the light-transmitting electrodes are not formed, in order to make the electrodes unnoticeable. In the present invention, the electrodes discontinuous at each intersection are electrically connected by the light-transmitting relay electrode formed on the light-transmitting interlayer insulation film. Therefore, the area occupied by the intersections is narrow. In addition, the intersections are composed of a laminate of light-transmitting thin films and are thus made unnoticeable. As a result, in the present invention, the intersections are unnoticeable when viewed from the input surface side of the input device, and thus a high-quality image may be displayed when an image forming device is disposed at the back of the input device.

In the present invention, it is preferred that the multilayer film is formed over the entire input region including the region where the first light-transmitting electrodes and the second light-transmitting electrodes are not formed. In this configuration, patterning of the first light-transmitting electrodes and the second light-transmitting electrodes is easily efficiently performed, thereby simplifying the manufacturing process.

In the present invention, the light-transmitting substrate may be a glass substrate, the first light-transmitting electrodes and the second light-transmitting electrodes may be composed of an ITO film, and the multilayer film may include the niobium oxide film formed on the light-transmitting substrate and a silicon oxide film laminated on the niobium oxide film.

In this case, preferably, the niobium oxide film has a thickness of 4 nm to 6 nm and a refractive index of 2.22 to 2.37, the silicon oxide film has a thickness of 52 nm to 60 nm or 70 nm to 78 nm and a refractive index of 1.425 to 1.49, and the ITO film has a thickness of 17 nm to 23 nm and a refractive index of 1.87 to 1.945. In this configuration, the first light-transmitting electrodes and the second light-transmitting electrodes are composed of an ITO thick film, and thus the resistance of the light-transmitting electrodes is decreased.

In the present invention, the surface of the light-transmitting substrate on which the first light-transmitting electrodes and the second light-transmitting electrodes are formed may be covered with at least a light-transmitting resin layer. The light-transmitting resin layer includes an interlayer insulating film and an adhesive layer. In this configuration, even when the light-transmitting electrodes are slightly noticeable before the light-transmitting resin layer is provided, the light-transmitting electrodes become unnoticeable after the light-transmitting resin layer is provided.

When a display device with an input function is configured using a capacitive input device according to the present invention, an image forming device is disposed on the side opposite to the input side of the capacitive input device.

A display device with an input function according to the present invention may be used for electronic apparatuses such as a cellular phone, an electronic notebook, a terminal device such as a POS terminal, and the like.

BRIEF DESCRIPTION OF THE DRAWINGS

The invention will be described with reference to the accompanying drawings, wherein like numbers reference like elements.

FIG. 2 is a drawing schematically illustrating a planar configuration of a first light-transmitting electrode pattern and a second light-transmitting pattern formed in an input device according to a first embodiment of the present invention.

FIG. 8 is a drawing schematically illustrating a planar configuration of a first light-transmitting electrode pattern and a second light-transmitting pattern formed in an input device according to a second embodiment of the present invention.

DESCRIPTION OF EXEMPLARY EMBODIMENTS

Figure 1A:
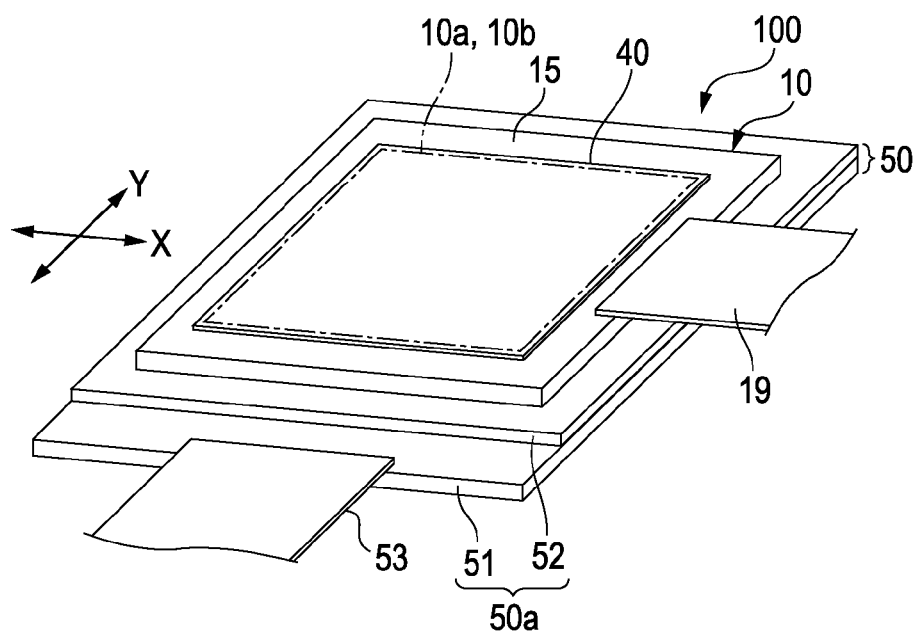
FIG. 1A is a drawing schematically illustrating a configuration of a display device with an input function according to the present invention.

Embodiments of the present invention are described with reference to the drawings. In the drawings referred to in the description below, the reduction scales of layers and members are different from each other in order to show the layers and members in recognizable sizes in the drawings.

First Embodiment (Entire Configuration)

Figure 1B:
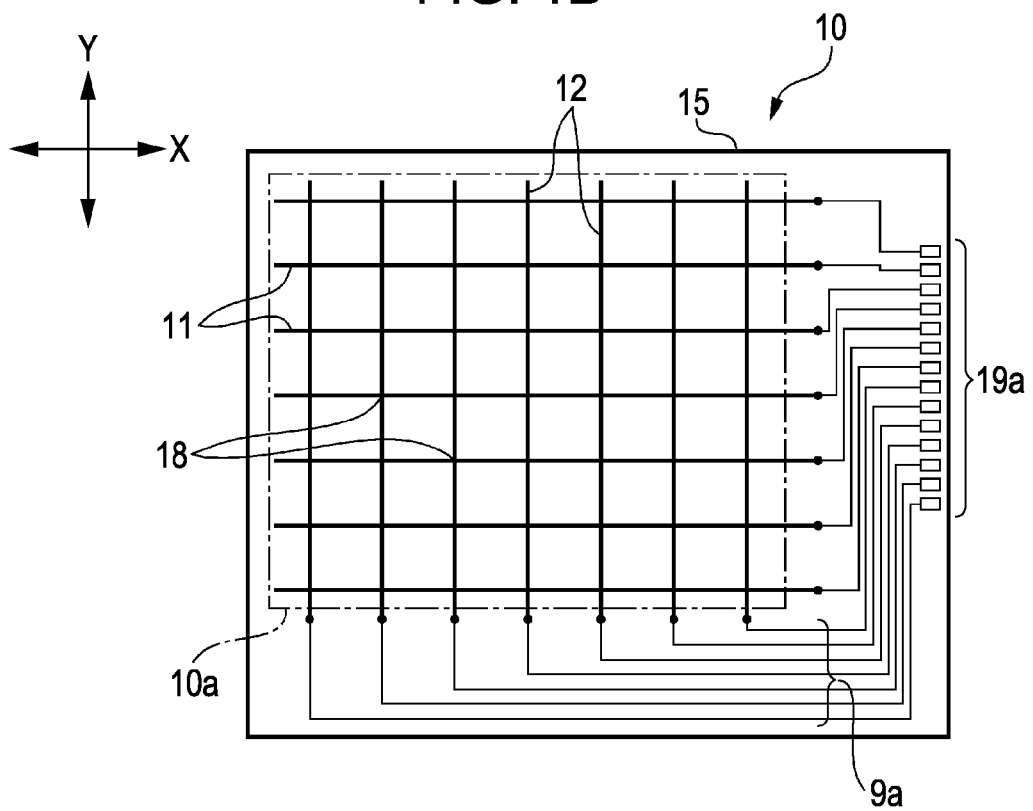
FIG. 1B is a drawing schematically illustrating a planar configuration of the display device with an input function shown in FIG. 1A.

FIG. 1A is a drawing schematically illustrating a configuration of a display device with an input function according to the present invention. FIG. 1B is a drawing schematically illustrating a planar configuration of the display device with an input function shown in FIG. 1A. In FIG. 1B, a first light-transmitting electrode pattern (first light-transmitting electrodes) and a second light-transmitting electrode pattern (second light-transmitting electrodes) are simplified using solid lines, and the number of these light-transmitting electrodes is also decreased.

In FIG. 1A, a display device 100 with an input function according to this embodiment includes a liquid crystal device 50 serving as an image-forming device, and a panel-shaped input device 10 (touch panel) laminated on the display light emission side of the image-forming device. The liquid crystal device 50 is provided with a reflective or transflective active matrix-type liquid crystal panel 50a. In a transmissive or transflective liquid crystal panel, a backlight device (not shown) is disposed on the side opposite to the display light emission side. In the liquid crystal device 50, a retardation film and a polarization plate (not shown) are laminated on the liquid crystal panel 50a. The liquid crystal panel 50a is provided with an element substrate 51, a counter substrate 52 opposed to the element substrate 51, and a liquid crystal layer held between the counter substrate 52 and the element substrate 51, and a flexible substrate 53 is connected to a region of the element substrate 51 which projects from the edge of the counter substrate 52. Further, driving IC may be COG (Chip on Glass)-mounted on the element substrate 51. In any case, the liquid display device 50 is capable of displaying moving images and still images and, when input is made on to the input device 10, an indicative image is displayed according to input information. Therefore, the user is allowed to input information by touching the indicative image displayed by the input device 10 with a finger.

The input device 10 includes a capacitive touch panel and is provided with a light-transmitting substrate 15, a light-transmitting cover substrate 40 bonded to the light-transmitting substrate 15 with an adhesive layer (light-transmitting resin layer) described below, and a flexible substrate 19 connected to the end of the light-transmitting substrate 15. In addition, a driving circuit (not shown) is connected to the flexible substrate 19, for detecting an input position on the input device 10. In the input device 10, the upper surface of the cover substrate 40 constitutes an input surface 10b, and a substantially central region of the cover substrate 40 is an input region 10a for input by finger touch.

As shown in FIG. 1B, a first light-transmitting electrode pattern 11 including a plurality of electrode lines extending in a first direction shown by arrow X and a second light-transmitting pattern 12 including a plurality of electrode lines extending in a second direction shown by arrow Y crossing the first direction are formed in a region corresponding to the input region 10a on the input surface 10b side of the light-transmitting substrate 15.

In the input device 10 with such a configuration, when a voltage is sequentially applied to apply charge to the first light-transmitting electrode pattern and the second light-transmitting electrode pattern, touching a position on the input region 10a with a finger, which is a conductor, causes a capacitance between the first light-transmitting electrode pattern 11 and the second light-transmitting electrode pattern 12 and the finger, resulting in a decrease in capacitance. Therefore, it is possible to detect the position touched with a finger.

(Detailed Configuration of Input Device 10)

Figure 3A:
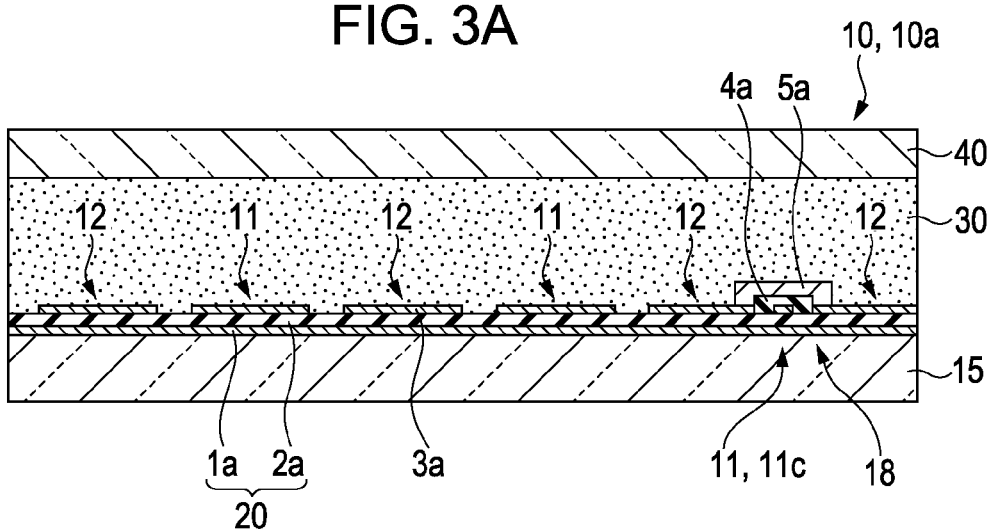
FIG. 3A is a schematic sectional view of the input device according to the first embodiment of the present invention, taken along line IIIA-IIIA of FIG. 2.
Figure 3B:
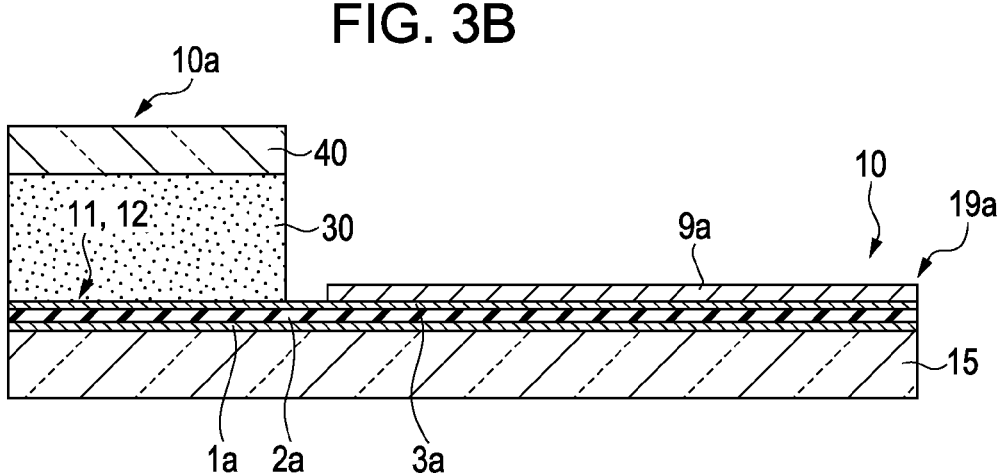
FIG. 3B is a sectional view showing a connection structure between a light-transmitting electrode pattern and a metal wiring.
Figure 3C:
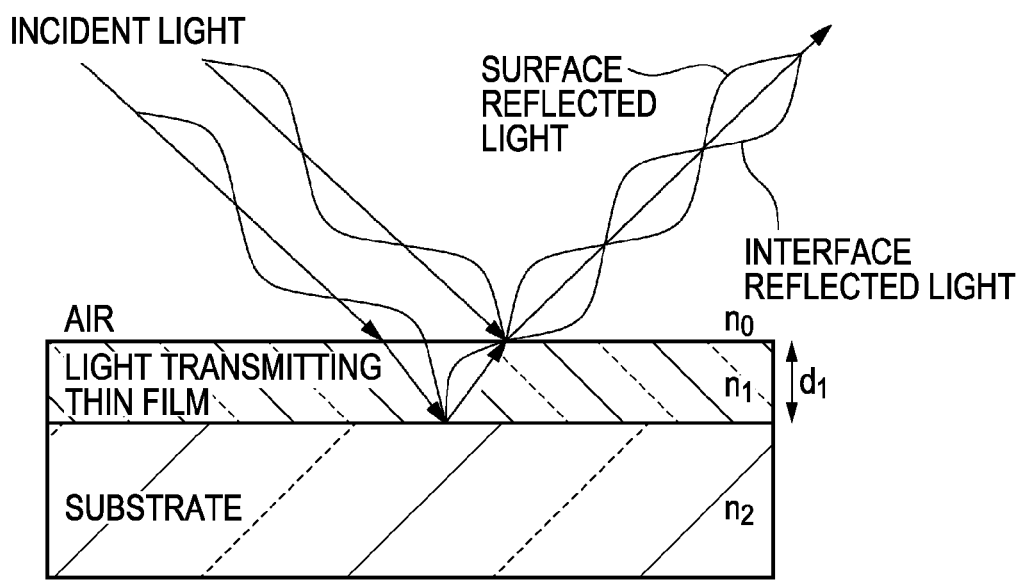
FIG. 3C is a drawing illustrating an anti-reflection technique using optical interference.

FIG. 2 is a drawing schematically illustrating a planar configuration of the first light-transmitting electrode pattern and the second light-transmitting pattern formed in the input device according to the first embodiment of the present invention. FIG. 3A is a schematic sectional view of the input device according to the first embodiment of the present invention, taken along line IIIA-IIIA of FIG. 2. FIG. 3B is a sectional view showing a connection structure between a light-transmitting electrode pattern and a metal wiring. FIG. 3C is a drawing illustrating an anti-reflection technique using optical interference. FIG. 2 shows a portion of the first light-transmitting electrode pattern and the second light-transmitting pattern.

As shown in FIG. 1B, FIG. 2, and FIG. 3A, in the input device 10 of this embodiment, the first light-transmitting electrode pattern 11 and the second light-transmitting pattern 12 are formed in the same layer on the same surface of the light-transmitting substrate 15. Also, in the input region 10a, there are a plurality of intersections 18 between the first light-transmitting electrode pattern 11 and the second light-transmitting electrode pattern 12 because the first transmissive electrode pattern 11 and the second light-transmitting pattern 12 are formed in the same layer on the same surface of the light-transmitting substrate 15.

Therefore, in this embodiment, at each of the plurality of intersections 18, one of the first light-transmitting electrode pattern 11 and the second light-transmitting electrode pattern 12 is continuous, while the other electrode pattern is discontinuous. In this embodiment, at each of the plurality of intersections 18, the first light-transmitting electrode pattern 11 is continuous, while the second light-transmitting electrode pattern 12 is discontinuous.

Also, at each of the intersections 18, a light-transmitting interlayer insulation film 4a is formed on the first light-transmitting electrode pattern 11, and a light-transmitting relay electrode 5a is formed on the interlayer insulation film 4a in order to electrically connect the discontinuous portions at each intersection 18 in the second light-transmitting electrode pattern 12. Therefore, the second light-transmitting electrode pattern 12 is electrically continuous in the second direction.

The first light-transmitting electrode pattern 11 and the second light-transmitting electrode pattern 12 have rhombic large-area pad portions (large-area portions) 11a and 12a, respectively, which are surrounded by the intersections 18. In the first light-transmitting electrode pattern 11, a connecting portion 11c at each of the intersections 18 is narrower than the pad portions (large-area portions) 11a. In addition, the relay electrodes 5a are formed in a narrower strip than the pad portions (large-area portions) 11a and 12a.

Further, a light-transmitting cover substrate 40 is bonded, with an adhesive layer 30 (light-transmitting resin layer), to the input region 10a on the side of the light-transmitting substrate 15 on which the first light-transmitting electrode pattern 11 and the second light-transmitting electrode pattern 12 have been formed.

As shown in FIGS. 1A, 1B, and 3B, a plurality of metal wirings 9a is formed in a region outside the input region 10a of the light-transmitting substrate 15 so as to be electrically connected to the first light-transmitting electrode pattern 11 and the second light-transmitting electrode pattern 12. The ends of the metal wirings 9a constitute terminals 19a for connecting the flexible substrate 19.

In the input device 10 configured as described above according to this embodiment, the first light-transmitting electrode pattern 11 and the second light-transmitting electrode pattern 12 are visualized due to a difference in reflectance between a region where the first light-transmitting electrode pattern 11 and the second light-transmitting electrode pattern 12 are formed and a region where the first light-transmitting electrode pattern 11 and the second light-transmitting electrode pattern 12 are not formed, thereby decreasing appearance. In this embodiment, therefore, for the purpose of preventing a decrease in appearance, the material and thickness of the first light-transmitting electrode pattern 11 and the second light-transmitting electrode pattern 12 are determined on the basis of the anti-reflection technique using optical interference which will be described below with reference to FIG. 3C.

As shown in FIG. 3C, the anti-reflection technique using optical interference is a technique in which when incident light is reflected at a surface of a thin film and an interface between a substrate and the thin film, the phases of surface-reflected light and interface-reflected light are reversed and canceled by each other, decreasing reflected light. In other words, in FIG. 3C, when the refractive index ($n_0$) of an air layer, the refractive index ($n_1$) and the thickness ($d_1$) of the thin film, and the refractive index ($n_2$) of the substrate satisfy the following expression:

$$(n_1)^2 = n_0 \times n_2$$

$$n_1 \times d_1 = \lambda/4,$$

the reflectance at wavelength λ (nm) becomes 0%. Since the anti-reflection effect has dependency on wavelength and on the thickness of the thin film, an optical simulation was performed. As a result, it was concluded that a difference in reflectance between a region where the first light-transmitting electrode pattern 11 and the second light-transmitting electrode pattern 12 are formed and a region where the first light-transmitting electrode pattern 11 and the second light-transmitting electrode pattern 12 are not formed may be removed by the anti-reflection technique using optical interference, thereby making the first light-transmitting electrode pattern 11 and the second light-transmitting electrode pattern 12 invisible.

Therefore, in this embodiment, the first light-transmitting electrode pattern 11 and the second light-transmitting electrode pattern 12 are composed of an ITO film 3a, and a multilayer film 20 is formed between the first light-transmitting electrode pattern 11 and the light-transmitting substrate 15 and between the second light-transmitting electrode pattern 12 and the light-transmitting substrate 15 in order to realize the anti-reflection structure described with reference to FIG. 3C.

In this embodiment, as the multilayer film 20, a niobium oxide film 1a formed on the surface of the light-transmitting substrate 15 and a silicon oxide film 2a formed on the niobium oxide film 1a are used. The multilayer film 20 is not patterned and formed in a solid pattern as an underlying film below the first light-transmitting electrode pattern 11 and the second light-transmitting electrode pattern 12. Namely, the multilayer film 20 is formed over the entire input region including the region where the first light-transmitting electrode pattern 11 and the second light-transmitting electrode pattern 12 are not formed. The niobium oxide film 1a is represented by $Nb_2O_5$, but the ratio between niobium atom and oxygen atom may shift according to the film formation conditions, and the refractive index also is shifted by such a shift of the ratio. Also, the silicon oxide film 2a is represented by $SiO_2$, but the ratio between silicon atom and oxygen atom may shift according to the film formation conditions, and the refractive index also is shifted by such a shift of the ratio. In addition, the ratio between indium atom, tin atom, and oxygen atom of the ITO film 3a may shift according to the film formation conditions, and the refractive index also is shifted by such a shift of the ratio.

When the anti-reflection structure is realized using the multilayer film 20, in this embodiment, the thicknesses of the niobium oxide film 1a and the silicon oxide film 2a are optimized in consideration of the refractive index of the light-transmitting substrate 15 and the thickness and refractive index of the ITO film 3a which constitutes the first light-transmitting electrode pattern 11 and the second light-transmitting electrode pattern 12. Since the refractive indexes of the niobium oxide film 1a, the silicon oxide film 2a, and the ITO film 3a depend on the film formation conditions, in this embodiment, the refractive index and thickness of each layer are determined to the conditions below on the basis of the investigation results shown in FIGS. 4A to 6B.

Adhesive layer 30: refractive index=1.48, thickness=225,000 nm

ITO film 3a: refractive index=1.91, thickness=20 nm

Silicon oxide film 2a: refractive index=1.45, thickness=55 nm or 75 nm

Niobium oxide film 1a: refractive index=2.30, thickness=5 nm

Light-transmitting substrate 15 (glass): refractive index=1.52, thickness=500,000 nm (Configuration of the Niobium Oxide Film 1a and Relationship to Reflectance Difference Due to Presence of the ITO film 3a)

Figure 4A:
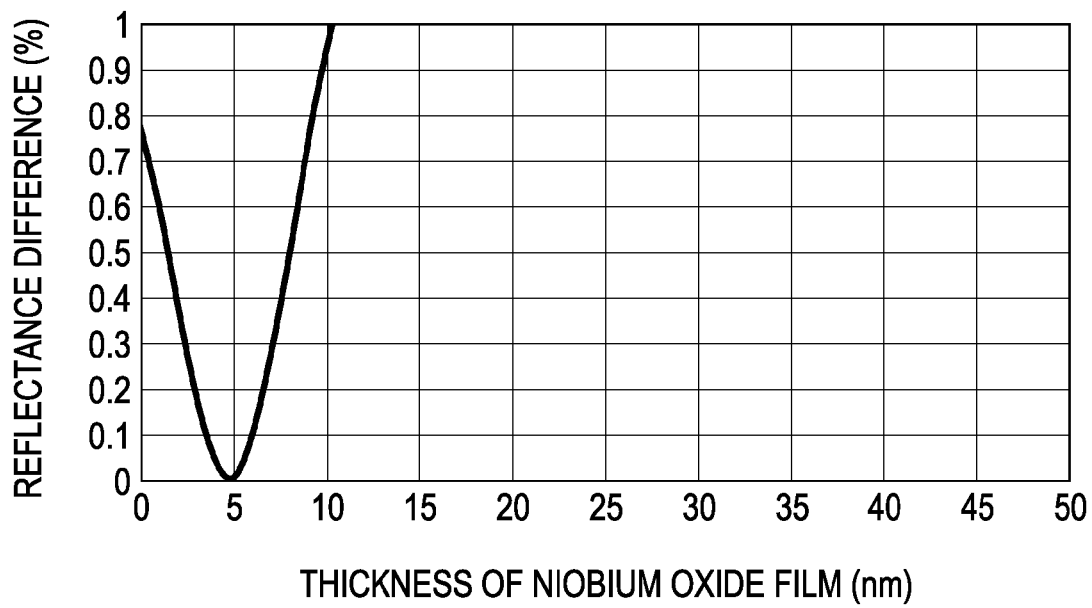
FIG. 4A is a graph showing a relationship between the thickness of a niobium oxide film and a reflectance difference between the presence and absence of an ITO film (light-transmitting electrode pattern) in an input device according to the present invention.
Figure 4B:
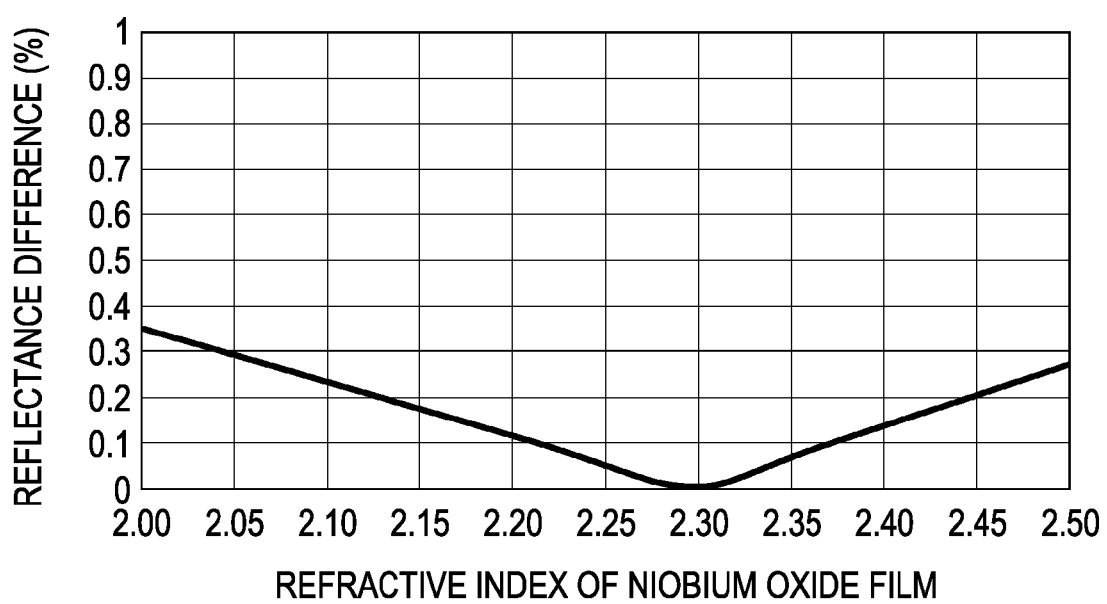
FIG. 4B is a graph showing a relationship between the refractive index of a niobium oxide film and a reflectance difference between the presence and absence of an ITO film (light-transmitting electrode pattern) in an input device according to the present invention.

The relationships between the refractive index and thickness of the niobium oxide film 1a and a reflectance difference between the presence and absence of the ITO film 3a in the input device according to the present invention are described with reference to FIGS. 4A and 4B. FIGS. 4A and 4B are graphs respectively showing the relationships between the thickness and the refractive index of the niobium oxide film 1a and a reflectance difference between the presence and absence of the ITO film 3a (light-transmitting electrode pattern) in the input device according to the present invention.

FIG. 4A shows changes in the reflectance difference between the presence and absence of the ITO film 3a (light-transmitting electrode pattern) with changes in the thickness of the niobium oxide film 1a under the following fixed conditions of the various investigation results:

Adhesive layer 30: refractive index=1.48, thickness=225,000 nm
ITO film 3a: refractive index=1.91, thickness=20 nm
Silicon oxide film 2a: refractive index=1.45, thickness=55 nm
Niobium oxide film 1a: refractive index=2.30
Light-transmitting substrate 15 (glass): refractive index=1.52, thickness=500,000 nm FIG. 4B shows changes in the reflectance difference between the presence and absence of the ITO film 3a (light-transmitting electrode pattern) with changes in the refractive index of the niobium oxide film 1a under the following fixed conditions:

Adhesive layer 30: refractive index=1.48, thickness=225,000 nm
ITO film 3a: refractive index=1.91, thickness=20 nm
Silicon oxide film 2a: refractive index=1.45, thickness=55 nm
Niobium oxide film 1a: thickness=5 nm
Light-transmitting substrate 15 (glass): refractive index=1.52, thickness=500,000 nm As shown in FIGS. 4A and 4B, when the thickness and refractive index of the niobium oxide film 1a are 5 nm and 2.30, respectively, the reflectance difference between the presence and absence of the ITO film 3a (light-transmitting electrode pattern) may be minimized, and the presence of the first light-transmitting electrode pattern 11 and the second light-transmitting electrode pattern 12 is made unnoticeable.

When the thickness and refractive index of the niobium oxide film 1a are 5 nm and 2.30, respectively, the reflectance difference between the presence and absence of the ITO film 3a (light-transmitting electrode pattern) is minimized. However, as shown in FIGS. 4A and 4B, when the thickness and refractive index are within the range of 4 nm to 6 nm and the range of 2.22 to 2.37, respectively, so that the reflectance difference is 0.1% or less, there may be obtained the effect of making the presence of the first light-transmitting electrode pattern 11 and the second light-transmitting electrode pattern 12 unnoticeable.

(Configuration of the Silicon Oxide Film 2a and Relationship to Reflectance Difference Due to Presence of the ITO film 3a)

Figure 5A:
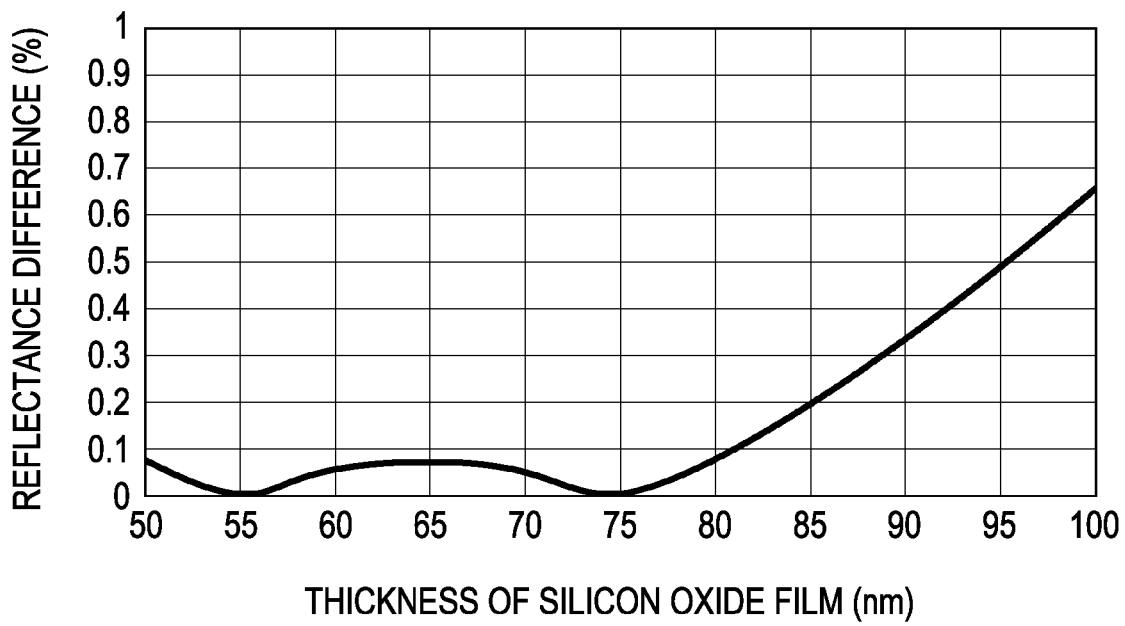
FIG. 5A is a graph showing a relationship between the thickness of a silicon oxide film and a reflectance difference between the presence and absence of an ITO film (light-transmitting electrode pattern) in an input device according to the present invention.
Figure 5B:
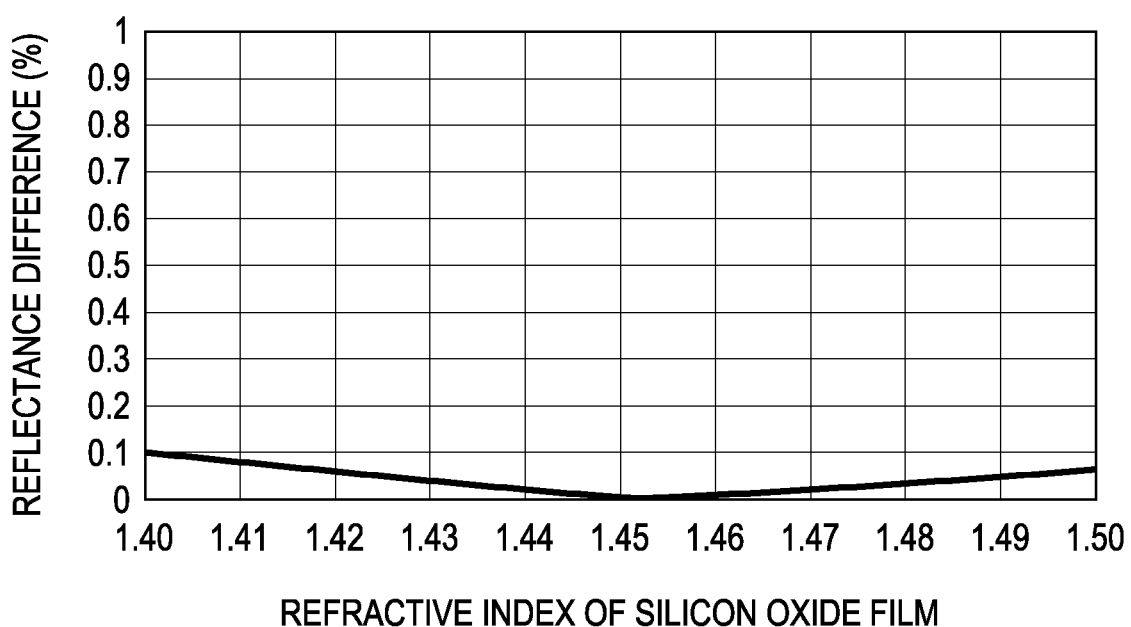
FIG. 5B is a graph showing a relationship between the refractive index of a silicon oxide film and a reflectance difference between the presence and absence of an ITO film (light-transmitting electrode pattern) in an input device according to the present invention.

The relationships between the refractive index and thickness of the silicon oxide film 2a and a reflectance difference between the presence and absence of the ITO film 3a in the input device according to the present invention are described with reference to FIGS. 5A and 5B. FIGS. 5A and 5B are graphs respectively showing the relationships between the thickness and the refractive index of the silicon oxide film 2a and a reflectance difference between the presence and absence of the ITO film 3a (light-transmitting electrode pattern) in the input device according to the present invention.

FIG. 5A shows changes in the reflectance difference between the presence and absence of the ITO film 3a (light-transmitting electrode pattern) with changes in the thickness of the silicon oxide film 2a under the following fixed conditions of the various investigation results:

Adhesive layer 30: refractive index=1.48, thickness=225,000 nm
ITO film 3a: refractive index=1.91, thickness=20 nm
Silicon oxide film 2a: refractive index=1.45,
Niobium oxide film 1a: refractive index=2.30, thickness=5 nm
Light-transmitting substrate 15 (glass): refractive index=1.52, thickness=500,000 nm FIG. 5B shows changes in the reflectance difference between the presence and absence of the ITO film 3a (light-transmitting electrode pattern) with changes in the refractive index of the silicon oxide film 2a under the following fixed conditions:

Adhesive layer 30: refractive index=1.48, thickness=225,000 nm
ITO film 3a: refractive index=1.91, thickness=20 nm
Silicon oxide film 2a: thickness=55 nm
Niobium oxide film 1a: refractive index=2.30, thickness=5 nm
Light-transmitting substrate 15 (glass): refractive index=1.52, thickness=500,000 nm As shown in FIGS. 5A and 5B, when the thickness and refractive index of the silicon oxide film 2a are 55 nm or 75 nm and 1.45, respectively, the reflectance difference between the presence and absence of the ITO film 3a (light-transmitting electrode pattern) may be minimized, and the presence of the first light-transmitting electrode pattern 11 and the second light-transmitting electrode pattern 12 is made unnoticeable.

When the thickness and refractive index of the silicon oxide film 2a are 55 or 75 nm and 1.45, respectively, the reflectance difference between the presence and absence of the ITO film 3a (light-transmitting electrode pattern) is minimized. However, as shown in FIGS. 5A and 5B, when the thickness and refractive index are within the range of 52 nm to 60 nm or 70 nm to 78 nm and the range of 1.425 to 1.49, respectively, so that the reflectance difference is 0.05% or less, there may be obtained the effect of making the presence of the first light-transmitting electrode pattern 11 and the second light-transmitting electrode pattern 12 unnoticeable.

(Configuration of the ITO film 3a and Relationship to Reflectance Difference Due to Presence of the ITO film 3a)

Figure 6A:
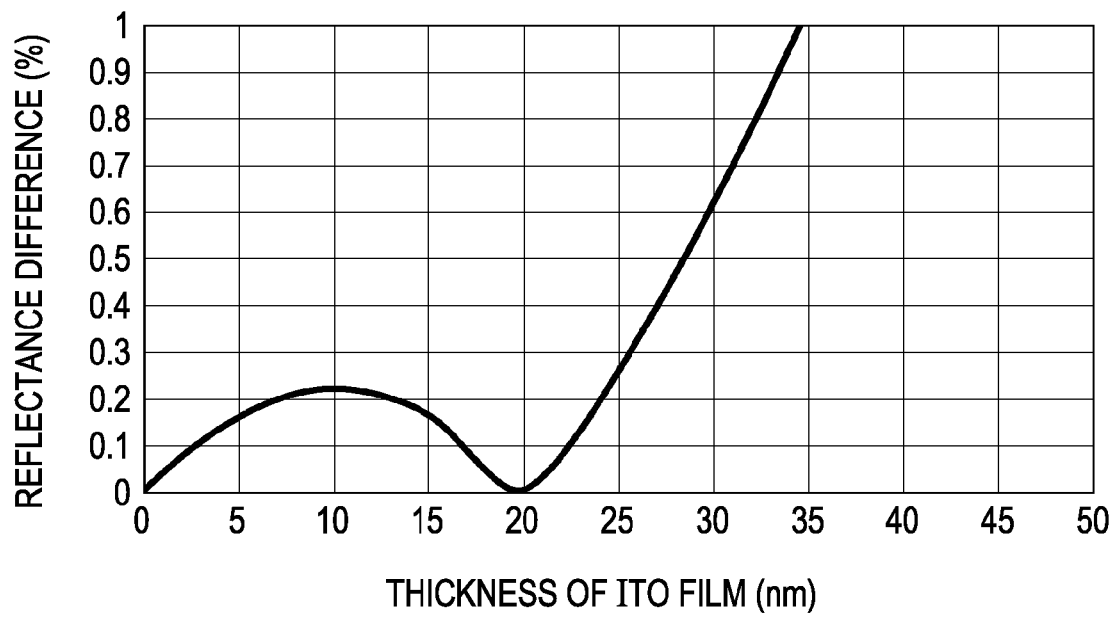
FIG. 6A is a graph showing a relationship between the thickness of an ITO film and a reflectance difference between the presence and absence of an ITO film (light-transmitting electrode pattern) in an input device according to the present invention.
Figure 6B:
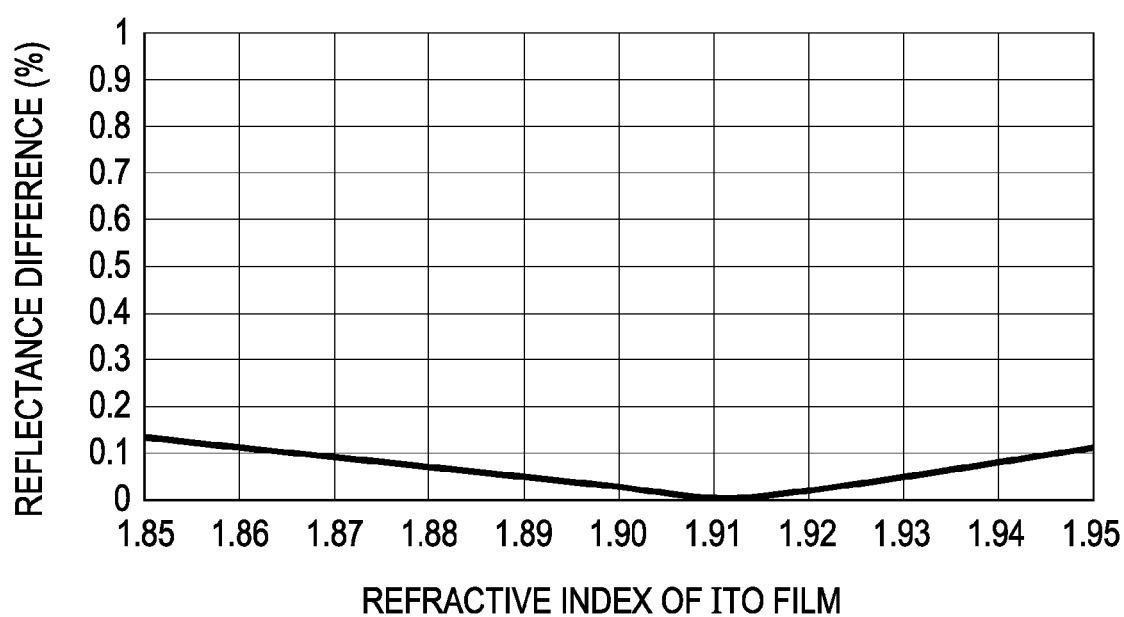
FIG. 6B is a graph showing a relationship between the refractive index of an ITO film and a reflectance difference between the presence and absence of an ITO film (light-transmitting electrode pattern) in an input device according to the present invention.

The relationships between the refractive index and thickness of the ITO film 3a and a reflectance difference between the presence and absence of the ITO film 3a in the input device according to the present invention are described with reference to FIGS. 6A and 6B. FIGS. 6A and 6B are graphs respectively showing the relationships between the thickness and the refractive index of the ITO film 3a and a reflectance difference between the presence and absence of the ITO film 3a (light-transmitting electrode pattern) in the input device according to the present invention.

FIG. 6A shows changes in the reflectance difference between the presence and absence of the ITO film 3a (light-transmitting electrode pattern) with changes in the thickness of the ITO film 3a under the following fixed conditions of the various investigation results:

Adhesive layer 30: refractive index=1.48, thickness=225,000 nm
ITO film 3a: refractive index=1.91 Silicon oxide film 2a: refractive index=1.45, thickness=55 nm Niobium oxide film 1a: refractive index=2.30, thickness=5 nm Light-transmitting substrate 15 (glass): refractive index=1.52, thickness=500,000 nm FIG. 6B shows changes in the reflectance difference between the presence and absence of the ITO film 3a (light-transmitting electrode pattern) with changes in the refractive index of the ITO film 3a under the following fixed conditions:

Adhesive layer 30: refractive index=1.48, thickness=225,000 nm

ITO film 3a: thickness=20 nm

Silicon oxide film 2a: thickness=55 nm

Niobium oxide film 1a: refractive index=2.30, thickness=5 nm

Light-transmitting substrate 15 (glass): refractive index=1.52, thickness=500,000 nm As shown in FIGS. 6A and 6B, when the thickness and refractive index of the ITO film 3a are 20 nm and 1.91, respectively, the reflectance difference between the presence and absence of the ITO film 3a (light-transmitting electrode pattern) may be minimized, and the presence of the first light-transmitting electrode pattern 11 and the second light-transmitting electrode pattern 12 is made unnoticeable.

When the thickness and refractive index of the ITO film 3a are 20 nm and 1.91, respectively, the reflectance difference between the presence and absence of the ITO film 3a (light-transmitting electrode pattern) is minimized. However, as shown in FIGS. 6A and 6B, when the thickness and refractive index are within the range of 17 nm to 23 nm and the range of 1.87 to 1.945, respectively, so that the reflectance difference is 0.1% or less, there may be obtained the effect of making the presence of the first light-transmitting electrode pattern 11 and the second light-transmitting electrode pattern 12 unnoticeable.

(Method for Manufacturing Input Device 10)

FIGS. 7A to 7E are sectional views showing steps of the method for manufacturing the input device according to the first embodiment of the present invention. FIGS. 7A to 7E each show the light-transmitting electrode patterns, the intersections, and the metal wiring. In each of FIGS. 7A to 7E, a portion corresponding to FIG. 3A is shown on the left side, and a portion corresponding to FIG. 3B is shown on the right side.

Figure 7A:
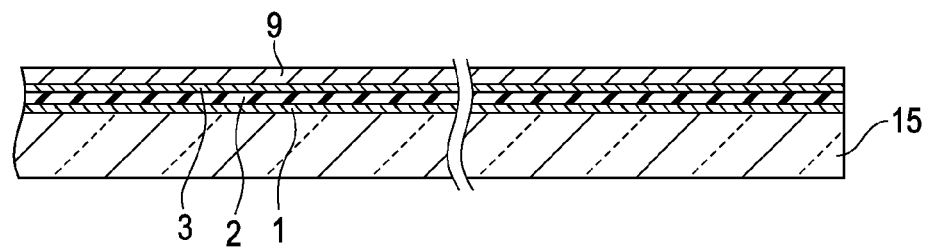
FIGS. 7A to 7E are sectional views showing steps of a method for manufacturing the input device according to the first embodiment of the present invention.

In order to manufacture the input device 10 of this embodiment, as shown in FIG. 7A, first a niobium oxide film 1 having a thickness of 5 nm, a silicon oxide film 2 having a thickness of 55 nm, and a polycrystalline ITO film 3 having a thickness of 20 nm are formed over the whole of one of the surfaces of the light-transmitting substrate 15 (glass substrate), and then a metal film 9 is formed. As a result, the ITO film 3 and the metal film 9 are laminated on the multilayer film 20 (underlying film) including the niobium oxide film 1 and the silicon oxide film 2.

Figure 7B:
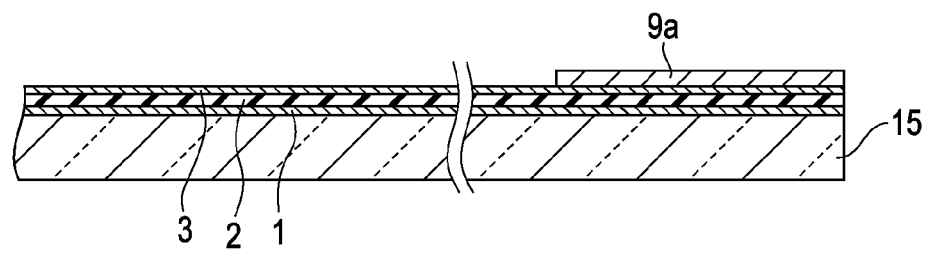

Next, the metal film 9 is patterned by etching through an etching mask formed on the surface of the metal film 9 and composed of a photosensitive resin or the like to form the metal wirings 9a as shown in FIG. 7B. Then, the etching mask is removed.

Figure 7C:
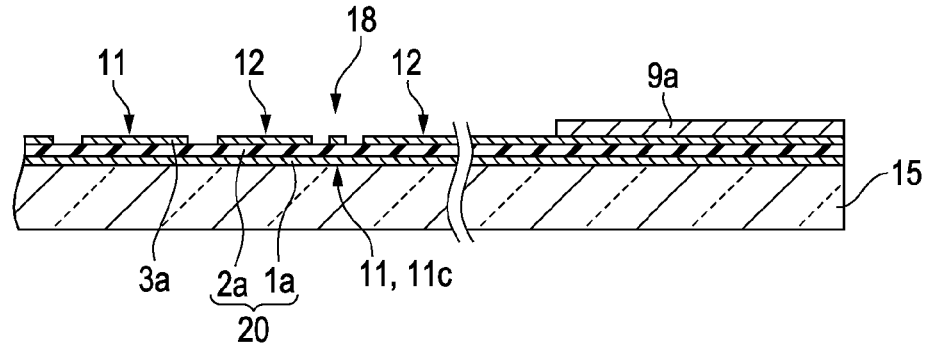

Next, the ITO film 3 is etched through an etching mask formed on the metal wirings 9a and the ITO film 3 using a photosensitive resin or the like to simultaneously form the first light-transmitting electrode pattern 11 and the second light-transmitting electrode pattern 12 as shown in FIG. 7C. Then, the etching mask is removed. At each of the intersections 18 of the first light-transmitting electrode pattern 11 and the second light-transmitting electrode pattern 12 formed as described above, the pad portions (large-area portions) 1a of the first light-transmitting electrode pattern 11 are connected to each other through the connecting portion 11c, while the second light-transmitting electrode pattern 12 is discontinuous. In this embodiment, when the first light-transmitting electrode pattern 11 and the second light-transmitting electrode pattern 12 are formed, the multilayer film 20 is not patterned, and thus the first light-transmitting electrode pattern 11 and the second light-transmitting electrode pattern 12 may be easily efficiently formed, thereby simplifying the manufacturing process.

Figure 7D:
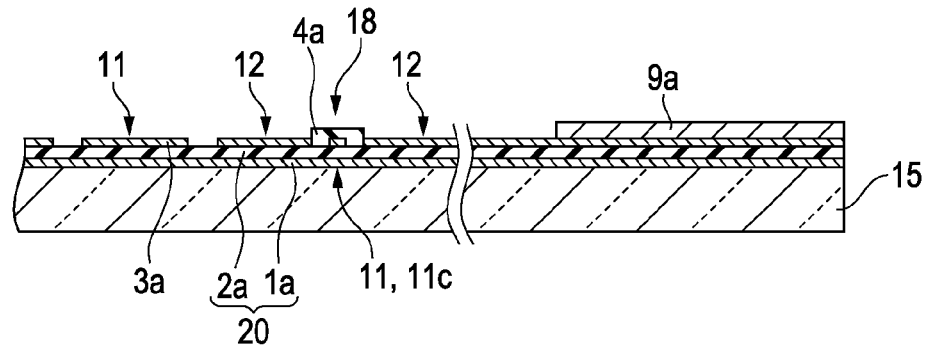
Figure 7E:
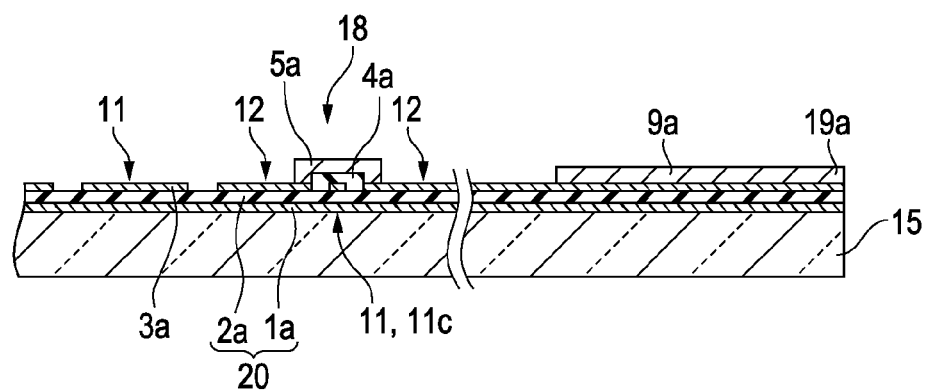

Next, an acrylic resin is applied on the surface side of the first light-transmitting electrode pattern 11 and the second light-transmitting electrode pattern 12, followed by exposure and development. As a result, as shown in FIG. 7D, the interlayer insulating films 4a are formed to cover the connecting portions 11c of the first light-transmitting electrode pattern 11.

Next, an amorphous ITO film is formed on the interlayer insulating films 4a and then etched through an etching mass formed on the surface of the ITO film using a photosensitive resin or the like to form the relay electrodes 5a on the interlayer insulating films 4a so that the discontinuous portions of the second light-transmitting electrode pattern 12 are connected to each other. Then, firing is performed at a temperature of 200° C. or more, for example, 220° C., for a time of 20 to 30 minutes to form a polycrystalline ITO film constituting the relay electrodes 5a. Since the amorphous ITO film can be etched with oxalic acid with which the polycrystalline ITO film is not etched, when the pattern of the relay electrodes 5a is formed, the ITO film 3a constituting the first light-transmitting electrode pattern 11 and the second light-transmitting electrode pattern 12 is not damaged. Also, since the ITO film constituting the relay electrodes 5a is made polycrystalline by firing, the electric resistance of the relay electrodes 5a can be decreased.

(Principal Effect of this Embodiment)

In this embodiment, as described above, the multilayer film 20 (the niobium oxide film 1a and the silicon oxide film 2a) including a laminate of light-transmitting thin films having different refractive indexes is formed below the first light-transmitting electrode pattern 11 and the second light-transmitting electrode pattern 12. Therefore, it is possible to remove a difference in reflectance between the region where the first light-transmitting electrode pattern 11 and the second light-transmitting electrode pattern 12 are formed and the region where the first light-transmitting electrode pattern 11 and the second light-transmitting electrode pattern 12 are not formed. Namely, in this embodiment, the multilayer film 20 including the niobium oxide film 1a having a thickness of 5 nm and the silicon oxide film 2a having a thickness of 55 nm is laminated as an underlying film between the glass substrate as the light-transmitting substrate 15 and the first light-transmitting electrode pattern 11 and the second light-transmitting electrode pattern 12 which are composed of the ITO film 3a having a thickness of 20 nm so that the phases of light reflected at the interfaces are reversed and canceled by each other. Therefore, it is possible to remove a difference in reflectance between the region where the first light-transmitting electrode pattern 11 and the second light-transmitting electrode pattern 12 are formed and the region where the first light-transmitting electrode pattern 11 and the second light-transmitting electrode pattern 12 are not formed, thereby preventing the first light-transmitting electrode pattern 11 and the second light-transmitting electrode pattern 12 from being visualized.

Conversely, in the present invention, the multilayer film 20 including the niobium oxide film 1a having a thickness of 5 nm and the silicon oxide film 2a having a thickness of 55 nm is formed as the underlying film below the first light-transmitting electrode pattern 11 and the second light-transmitting electrode pattern 12, and thus the ITO film 3a having a thickness of as large as 20 nm can be used for the first light-transmitting electrode pattern 11 and the second light-transmitting electrode pattern 12. Therefore, even when the electric resistance of the first light-transmitting electrode pattern 11 and the second light-transmitting electrode pattern 12 is decreased, the first light-transmitting electrode pattern 11 and the second light-transmitting electrode pattern 12 can be prevented from being visualized.

In particular, in this embodiment, the first light-transmitting electrode pattern 11 and the second light-transmitting electrode pattern 12 have the large-area pad portions (large-area portions) 11a and 12a and are thus noticeable. However, according to the present invention, even when the first light-transmitting electrode pattern 11 and the second light-transmitting electrode pattern 12 are formed in the above-described shape, these electrode patterns can be securely prevented from being noticeable.

Also, in this embodiment, the first light-transmitting electrode pattern 11 and the second light-transmitting electrode pattern 12 are formed on the same surface of the light-transmitting substrate 15, and thus the manufacturing process is simplified as compared with the case in which the first light-transmitting electrode pattern 11 and the second light-transmitting electrode pattern 12 are formed on the front and back surfaces of the light-transmitting substrate 15. Further, since the first light-transmitting electrode pattern 11 and the second light-transmitting electrode pattern 12 are formed in the same layer, the manufacturing process is simplified as compared with the case in which the first light-transmitting electrode pattern 11 and the second light-transmitting electrode pattern 12 are formed in different layers.

When the first light-transmitting electrode pattern 11 and the second light-transmitting electrode pattern 12 are formed in the same layer on the same surface of the light-transmitting substrate 15, the first light-transmitting electrode pattern 11 and the second light-transmitting electrode pattern 12 are preferably crossed each other, and the film structure at the intersections 18 is different from that of the first light-transmitting electrode pattern 11 and the second light-transmitting electrode pattern 12. Therefore, even when the first light-transmitting electrode pattern 11 and the second light-transmitting electrode pattern 12 are made unnoticeable, the presence of the intersections 18 becomes noticeable. However, in this embodiment, the discontinuous portions of the second light-transmitting electrode pattern 12 are electrically connected by the relay electrodes 5a formed on the interlayer insulating films 4a, and the connecting portions 11c which are disposed at the respective intersections 18 of the first light-transmitting electrode pattern 11 and the relay electrodes 5a are narrowed, thereby narrowing the area occupied by each of the intersections 18. In addition, the relay electrodes 5a are composed of an ITO film having a thickness of 10 nm to 15 nm, and the interlayer insulating films are composed of an acrylic resin. Therefore, the relay electrodes 5a and the interlayer insulating films at the intersections 18 are also made unnoticeable. Thus, in the present invention, the presence of the intersections 18 is unnoticeable when viewed from the input surface 10b side of the input device 10, and thus an image displayed by the liquid crystal device 50 is high quality when seen from the input surface 10b side of the input device 10.

Second Embodiment
(Entire Configuration)

Figure 9A:
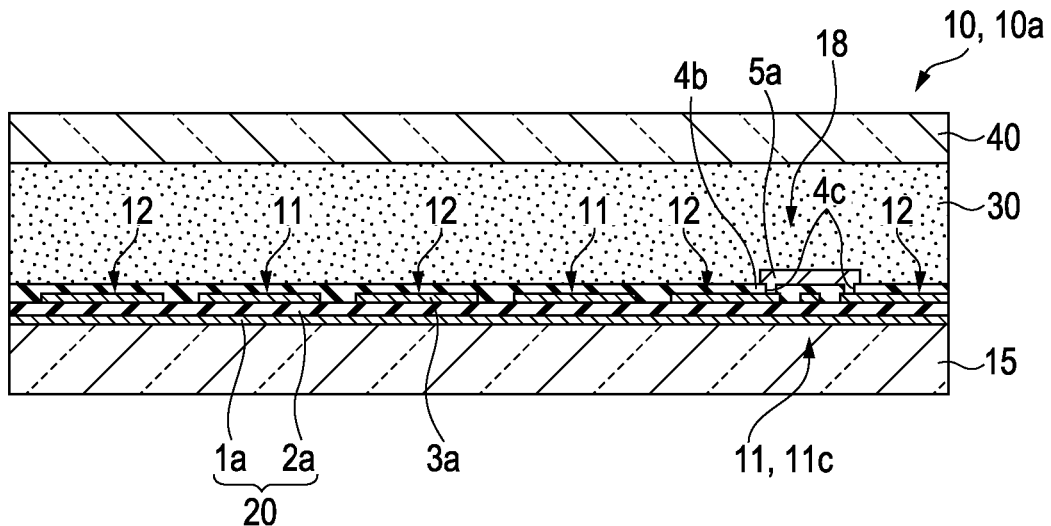
FIG. 9A is a schematic sectional view of the input device according to the first embodiment of the present invention, taken along line IXA-IXA of FIG. 8.
Figure 9B:
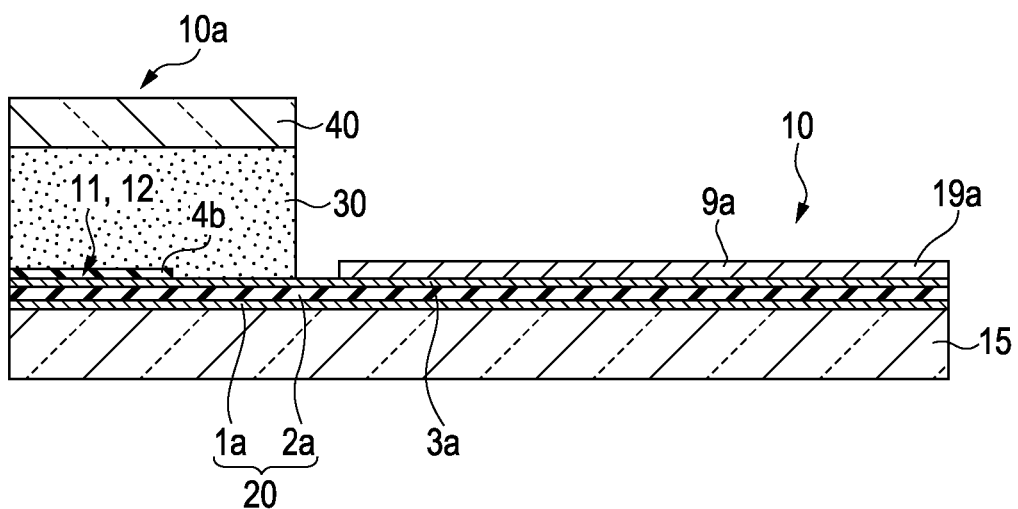
FIG. 9B is a sectional view showing a connection structure between a light-transmitting electrode pattern and a metal wiring.

FIG. 8 is a drawing schematically illustrating a planar configuration of a first light-transmitting electrode pattern and a second light-transmitting pattern formed in an input device according to a second embodiment of the present invention. FIG. 9A is a schematic sectional view of the input device according to the second embodiment of the present invention, taken along line IXA-IXA of FIG. 8. FIG. 9B is a sectional view showing a connection structure between a light-transmitting electrode pattern and a metal wiring. Since the basic components are the same as in the first embodiment, and common portions are denoted by the same reference numerals in the drawings and are not described below.

In FIG. 8 and FIG. 9A, like in the first embodiment, the input device 10 of the second embodiment includes a capacitive touch panel, and the first light-transmitting electrode pattern 11 including a plurality of electrode lines extending in a first direction and the second light-transmitting pattern 12 including a plurality of electrode lines extending in a second direction crossing the first direction are formed in the input region 10a on the input surface 10b side of the light-transmitting substrate 15. The first light-transmitting electrode pattern 11 and the second light-transmitting electrode pattern 12 are formed on the same surface of the light-transmitting substrate 15 and composed of the ITO film 3a. In addition, the multilayer film 20 (the niobium oxide film 1a and the silicon oxide film 2b) is formed below the first light-transmitting electrode pattern 11 and the second light-transmitting electrode pattern 12. Further, at each of the plurality of intersections 18 of the first light-transmitting electrode pattern 11 and the second light-transmitting electrode pattern 12, the first light-transmitting electrode pattern 11 is continuous, while the second light-transmitting electrode pattern 12 is discontinuous. Further, a light-transmitting cover substrate 40 is bonded, with an adhesive layer 30 (light-transmitting resin layer), to the input region 10a on the side of the light-transmitting substrate 15 on which the first light-transmitting electrode pattern 11 and the second light-transmitting electrode pattern 12 have been formed.

In this embodiment, the light-transmitting interlayer insulation film 4b (light-transmitting resin layer) is formed on the first light-transmitting electrode pattern 11 and the second light-transmitting electrode pattern 12 over the substantially entire surface of the input region 10a, and the light-transmitting relay electrodes 5a are formed on the interlayer insulating film 4b in order to electrically connect the electrodes discontinuous at the intersections 18 in the second light-transmitting electrode pattern 12 through contact holes 4c formed in the interlayer insulating film 4b. Therefore, the electrodes in the second light-transmitting electrode pattern 12 are electrically connected in the second direction.

Like in the first embodiment, in the second embodiment, the refractive index and thickness of each layer are determined to the conditions shown in the following list:

Adhesive layer 30: refractive index=1.48, thickness=225,000 nm

Interlayer insulating film 4b: refractive index=1.52, thickness=1,500 nm

ITO film 3a: refractive index=1.91, thickness=20 nm

Silicon oxide film 2a: refractive index=1.45, thickness=55 nm

Niobium oxide film 1a: refractive index=2.30, thickness=5 nm

Light-transmitting substrate 15 (glass): refractive index=1.52, thickness=500,000 nm FIGS. 4A and 4B show changes in the reflectance difference between the presence and absence of the ITO film 3a (light-transmitting electrode pattern) with changes in the thickness and refractive index of the niobium oxide film, respectively. FIGS. 5A and 5B show changes in the reflectance difference with changes in the thickness and refractive index of the silicon oxide film, respectively, and FIGS. 6A and 6B show changes in the reflectance difference with changes in the thickness and refractive index of the ITO film, respectively. Each of these figures show the results when an adhesive layer was provided without the interlayer insulating film 4b (thickness=0 nm). In the second embodiment, the refractive index (=1.52) of the interlayer insulation film 4b is close to the refractive index (=1.48) of the adhesive layer, and the thickness (=1,500 nm) of the interlayer insulation film 4b is significantly smaller than that (=225,000 nm) of the adhesive layer. Therefore, the results of the reflectance difference between the presence and absence of the ITO film 3a (light-transmitting electrode pattern) are substantially the same as shown in FIGS. 4A to 6B. In other words, FIGS. 4A and 4B show changes in the reflectance difference between the presence and absence of the ITO film 3a (light-transmitting electrode pattern) with changes in the thickness and refractive index of the niobium oxide film, respectively. FIGS. 5A and 5B show changes in the reflectance difference with changes in the thickness and refractive index of the silicon oxide film, respectively, and FIGS. 6A and 6B show changes in the reflectance difference with changes in the thickness and refractive index of the ITO film, respectively. Each of the figures shows the results when the adhesive layer (thickness=225,000 nm, refractive index=1.48) was provided with the interlayer insulating film 4b (thickness=1,500 nm, refractive index=1.52).

The first light-transmitting electrode pattern 11 and the second light-transmitting electrode pattern 12 have rhombic pad portions which are surrounded by the intersections 18. In the first light-transmitting electrode pattern 11, a connecting portion 11c at each of the intersections 18 is narrower than the pad portions. In addition, the relay electrodes 5a are formed in a narrower strip than the pad portions.

Further, as shown in FIG. 9B, a plurality of metal wirings 9a is formed in a region outside the input region 10a of the light-transmitting substrate 15 so as to be electrically connected to the first light-transmitting electrode pattern 11 and the second light-transmitting electrode pattern 12. The ends of the metal wirings 9a constitute terminals 19a for connecting the flexible substrate 19.

(Method for Manufacturing Input Device 10)

FIGS. 10A to 10E are sectional views showing steps of the method for manufacturing the input device according to the second embodiment of the present invention. FIGS. 10A to 10E each show the light-transmitting electrode patterns, the intersections, and the metal wiring. In each of FIGS. 10A to 10E, a portion corresponding to FIG. 9A is shown on the left side, and a portion corresponding to FIG. 9B is shown on the right side.

Figure 10A:
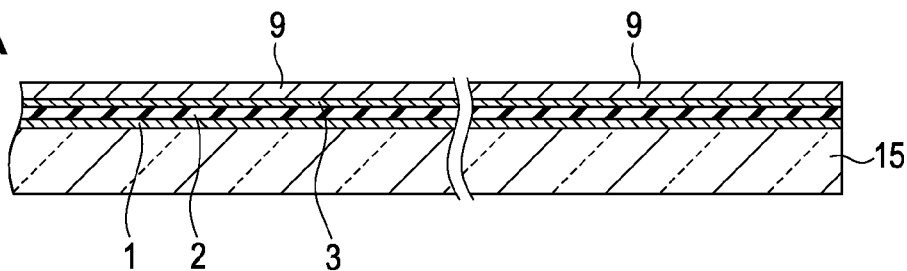
FIGS. 10A to 10E are sectional views showing steps of a method for manufacturing the input device according to the second embodiment of the present invention.

In order to manufacture the input device 10 of this embodiment, as shown in FIG. 10A, first a polycrystalline niobium oxide film 1a having a thickness of 5 nm, a silicon oxide film 2 having a thickness of 55 nm, and a polycrystalline ITO film 3 having a thickness of 20 nm are formed over the whole of one of the surfaces of the light-transmitting substrate 15 (glass substrate), and then a metal film 9 is formed.

Figure 10B:
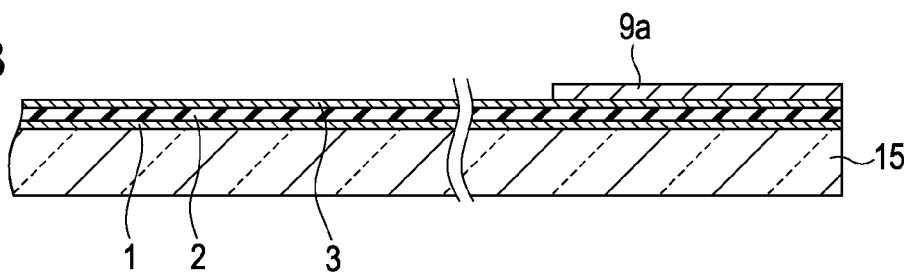

Next, the metal film 9 is patterned by etching through an etching mask formed on the surface of the metal film 9 and composed of a photosensitive resin or the like to form the metal wirings 9a as shown in FIG. 10B. Then, the etching mask is removed.

Figure 10C:
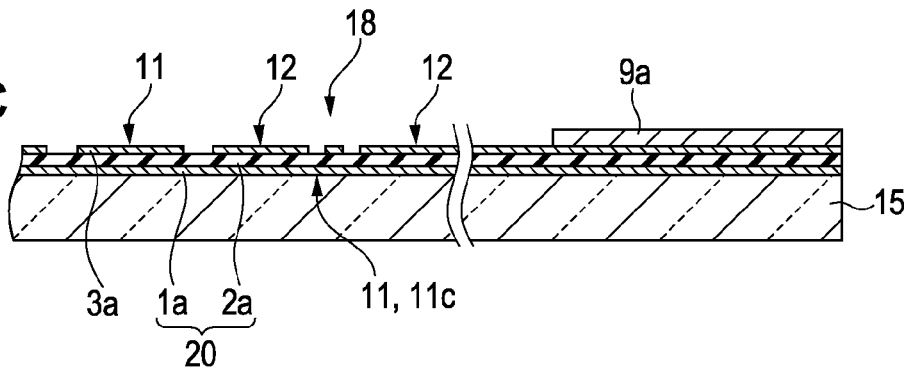

Next, the ITO film 3 is etched through an etching mask formed on the metal wirings 9a and composed of a photosensitive resin or the like to simultaneously form the first light-transmitting electrode pattern 11 and the second light-transmitting electrode pattern 12 as shown in FIG. 10C. Then, the etching mask is removed.

Figure 10D:
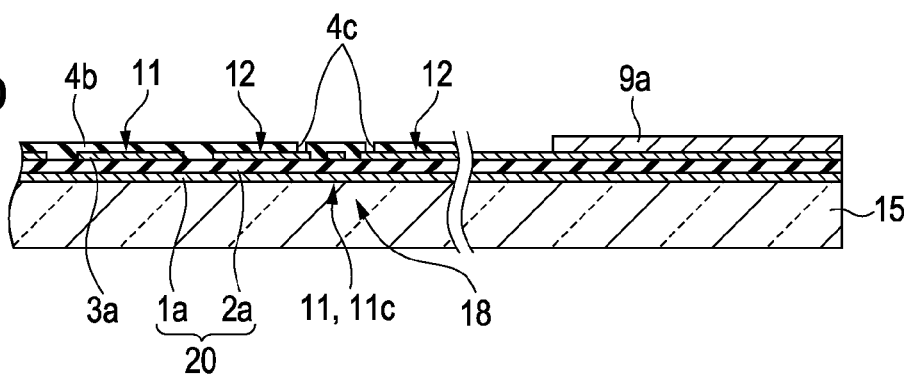
Figure 10E:
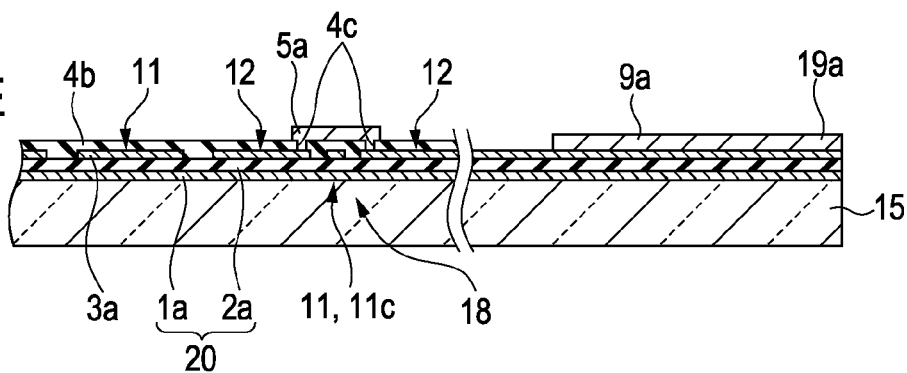

Next, an acrylic resin is applied on the surface side of the first light-transmitting electrode pattern 11 and the second light-transmitting electrode pattern 12, followed by exposure and development. As a result, as shown in FIG. 10D, the interlayer insulating film 4b is formed to overlap the intersections 18 of the first light-transmitting electrode pattern 11 and the second light-transmitting electrode pattern 12. At the same time, the contact holes 4c are formed in the interlayer insulating film 4b.

Next, a polycrystalline ITO film is formed on the interlayer insulating film 4b and then etched through an etching mass formed on the surface of the ITO film composed of a photosensitive resin or the like to form the relay electrodes 5a. In this step, the first light-transmitting electrode pattern 11 and the second light-transmitting electrode pattern 12 are not damaged because the first light-transmitting electrode pattern 11 and the second light-transmitting electrode pattern 12 are covered with the interlayer insulating film 4b. Instead of the polycrystalline ITO film, an amorphous ITO film may be formed, etched with oxalic acid through an etching mask composed of a photosensitive resin to form a pattern, and then annealed to form a polycrystalline ITO film.

(Principal Effect of this Embodiment)

Like in the first embodiment, in this embodiment, as described above, a multilayer film (the niobium oxide film 1a and the silicon oxide film 2a) is formed below the first light-transmitting electrode pattern 11 and the second light-transmitting electrode pattern 12. Therefore, it is possible to remove a difference in reflectance between the region where the light-transmitting electrode patterns are formed and the region where the light-transmitting electrode patterns are not formed. Thus, there is exhibited the same effect as in the first embodiment, such as the effect of making the first light-transmitting electrode pattern 11 and the second light-transmitting electrode pattern 12 unnoticeable.

[Other Embodiments]

Although, in the above-described embodiments, the ends of the metal wirings 9a are directly used as the terminals 19a, ITO films may be formed on the ends of the metal wirings 9a at the same time as the formation of the relay electrodes 5a, and the ends of the metal wirings 9a may be used as the terminals 19a. Although, in the second embodiment, the interlayer insulating film 4b is formed only in the input region 10a, the interlayer insulating film 4b may be formed over the substantially entire surface excluding the surfaces of the terminals 19a.

Although, in the above-described embodiments, a multilayer structure including the silicon oxide film 2a having a thickness of 55 nm is mainly described as an example of a multilayer film structure using thin film optical interference, the thickness of the silicon oxide film 2a may be 75 nm on the basis of the results shown in FIG. 5A.

Further, even when an allowance range of about 10% is determined for the thicknesses and the refractive indexes of the niobium oxide film 1a, the silicon oxide film 2a, and the ITO film 3a, a difference in reflectance between the region where the light-transmitting electrode patterns are formed and the region where the light-transmitting electrode patterns are not formed may be significantly reduced.

Although, in the above-described embodiments, the liquid crystal device 50 is used as the image forming device, an organic electroluminescence device or a plasma display device may be used an the image forming device.

[Examples of Mounting on Electronic Apparatus]

Figure 11A:
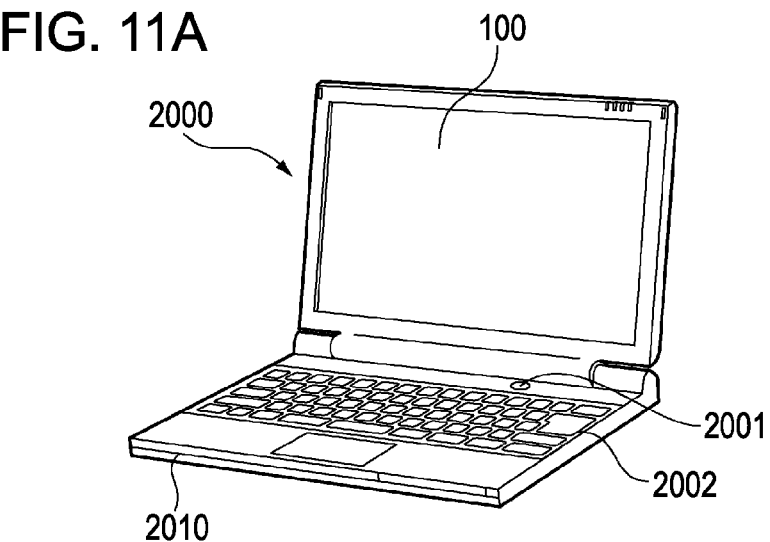
FIGS. 11A to 11C are drawings illustrating electronic apparatuses using a display device with an input function according to the present invention.
Figure 11B:
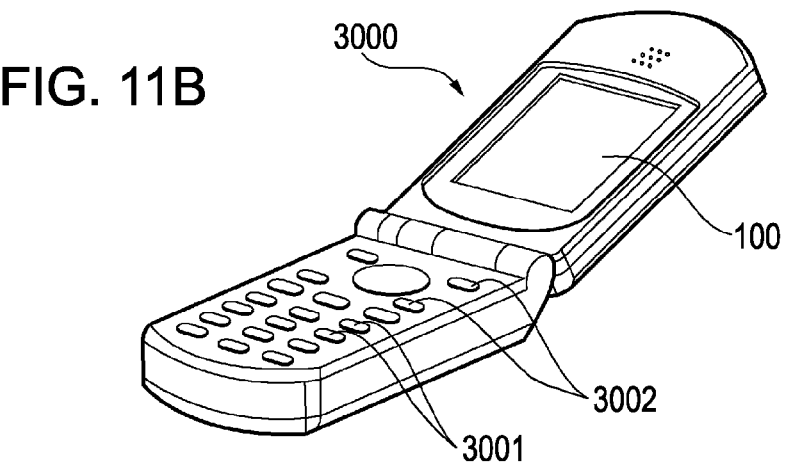
Figure 11C:
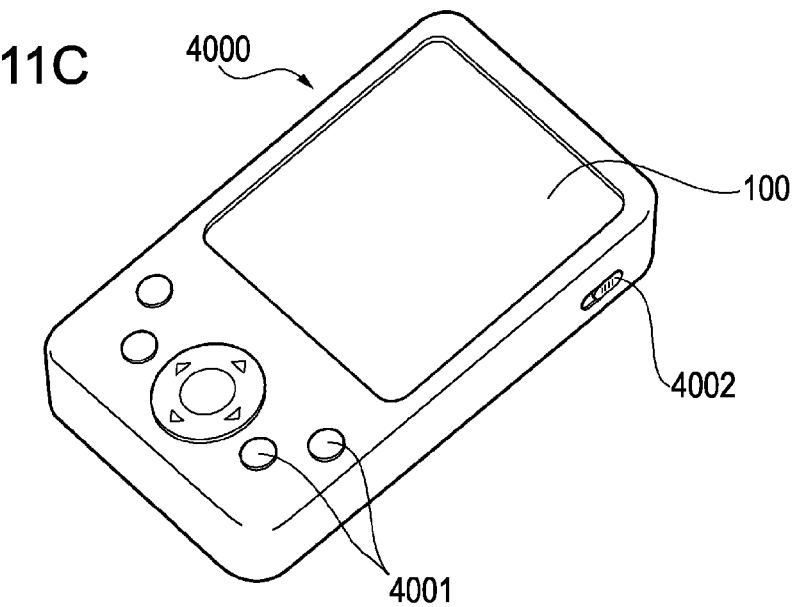

Next, description is made of an electronic apparatus to which the display device 100 with an input function according to any one of the above-described embodiments is applied. FIG. 11A shows a configuration of a mobile-type personal computer including the display device 100 with an input function. A personal computer 2000 includes the display device 100 with an input function serving as a display unit and a body portion 2010. The body portion 2010 is provided with a power supply switch 2001 and a keyboard 2002. FIG. 11B shows a configuration of a cellular phone including the display device 100 with an input function. A cellular phone 3000 is provided with a plurality of operation buttons 3001 and scroll buttons 3002, and the display device 100 with an input function serving as a display unit. An image displayed on the display device 100 with an input function is scrolled by operating the scroll buttons 3002. FIG. 11C shows a configuration of an information mobile terminal (PDA: Personal Digital Assistants) including the display device 100 with an input function. An information mobile terminal 4000 is provided with a plurality of operating buttons 4001, a power supply switch 4002, and the display device 100 with an input function serving as a display unit. When the power supply switch 4002 is operated, various items of information such as an address list, a schedule book, and the like are displayed on the display device 100 with an input function.

Examples of an electronic apparatus other than those shown in FIGS. 11A to 11C to which the display device 100 with an input function is applied include a digital still camera, a liquid crystal television, a car navigation system, a pager, an electronic notebook, an electronic calculator, a word processor, a work station, a television telephone, terminal devices such as a POS terminal, and the like.

What is claimed is:

1. A capacitive input device comprising:
a light-transmitting substrate;
a multilayer film formed on one of the surfaces of the light-transmitting substrate and including a plurality of light-transmitting thin films which have different refractive indexes and one of which is a niobium oxide film;
a plurality of first light-transmitting electrodes formed on the multilayer film in an input region of the light-transmitting substrate to extend in a first direction; and
a plurality of second light-transmitting electrodes formed on the multilayer film in the input region of the light-transmitting substrate to extend in a second direction crossing the first direction, wherein at each of the intersections between the first light-transmitting electrodes and the second light-transmitting electrodes, either the first or second light-transmitting electrodes are continuous with each other, while the other of the first or second light-transmitting electrodes are discontinuous with each other, wherein a light-transmitting interlayer insulation film consisting of an acrylic resin is formed on the continuous light-transmitting electrodes at each of the intersections, and a light-transmitting relay electrode consisting of ITO and having a film thickness smaller than that of the first and second light-transmitting electrodes is formed on the interlayer insulation film in order to electrically connect the other discontinuous light-transmitting electrodes at each intersection, and
wherein the light-transmitting substrate is a glass substrate;
the first light-transmitting electrodes and the second light-transmitting electrodes are composed of an ITO film; and
the multilayer film includes the niobium oxide film formed on the light-transmitting substrate and a silicon oxide film laminated on the niobium oxide film;
wherein the niobium oxide film has a thickness of 4 nm to 6 nm and a refractive index of 2.22 to 2.37;
the silicon oxide film has a thickness of 52 nm to 60 nm or 70 nm to 78 nm and a refractive index of 1.425 to 1.49; and
the ITO film has a thickness of 17 nm to 23 nm and a refractive index of 1.87 to 1.945.

2. The capacitive input device according to claim 1, wherein the first light-transmitting electrodes and the second light-transmitting electrodes are formed of the same material.

3. The capacitive input device according to claim 1, wherein the multilayer film is formed over the entire input region including the region where the first light-transmitting electrodes and the second light-transmitting electrodes are not formed.

4. The capacitive input device according to claim 1, wherein the surface of the light-transmitting substrate on which the first light-transmitting electrodes and the second light-transmitting electrodes are formed is covered with at least a light-transmitting resin layer.

5. A display device with an input function comprising the capacitive input device according to claim 1,
wherein an image forming device is disposed on the side opposite to an input side of the capacitive input device.

6. An electronic apparatus comprising the display device with an input function according to claim 5.

7. The capacitive input device according to claim 1, wherein the first light-transmitting electrodes and the second light-transmitting electrodes are formed so as to not cover any of a top surface of the light-transmitting interlayer insulation film.

8. The capacitive input device according to claim 1, wherein the first light-transmitting electrodes and the second light-transmitting electrodes are formed as a same layer by one etching process.

9. The capacitive input device according to claim 1, wherein the first light-transmitting electrodes and the second light-transmitting electrodes are formed as a same layer on the multilayer film in the input region of the light-transmitting substrate, so that the multilayer film with the first and second light-transmitting electrodes thereon function as an anti-reflection film using optical interference,
the first light-transmitting electrodes and the second light-transmitting electrodes are formed as a light-transmitting electrode film of the same material and having the same thickness, and
thickness and refractive indexes of each film of the multilayer and the light-transmitting electrode film, which form the anti-reflection film together, are arranged so that a light reflected at an interface between the light-transmitting substrate and the multilayer film, and a light reflected at an interface between the multilayer film and the light-transmitting electrode film are cancelled by each other, and a reflection light of an incident light from outside of the anti-reflection film is reduced.

10. The capacitive input device according to claim 1, wherein the light-transmitting relay electrode has a film thickness ranging from 10-15 nm.

11. The capacitive input device according to claim 1, wherein the first and second light-transmitting electrodes have a diamond-shaped outline in planar view, at a position other than a cross point between the first and second light-transmitting electrodes.

12. A capacitive input device comprising:
- a light-transmitting substrate;
- a multilayer film formed on one of the surfaces of the light-transmitting substrate and including a plurality of light-transmitting thin films which have different refractive indexes and one of which is a niobium oxide film;
- a plurality of first light-transmitting electrodes formed on the multilayer film in an input region of the light-transmitting substrate to extend in a first direction; and
- a plurality of second light-transmitting electrodes formed on the multilayer film in the input region of the light-transmitting substrate to extend in a second direction crossing the first direction, wherein at each of the intersections between the first light-transmitting electrodes and the second light-transmitting electrodes, either the first or second light-transmitting electrodes are continuous with each other, while the other of the first or second light-transmitting electrodes are discontinuous with each other, wherein a light-transmitting interlayer insulation film consisting of an acrylic resin is formed on the continuous light-transmitting electrodes and discontinuous light-transmitting electrodes over at least substantially the entire surface of the light-transmitting substrate, the light-transmitting interlayer insulation film including contact holes at each of the intersections, wherein a light-transmitting relay electrode consisting of ITO and having a film thickness smaller than that of the first and second light-transmitting electrodes is formed in the contact holes of the interlayer insulation film in order to electrically connect the other discontinuous light-transmitting electrodes at each intersection, and wherein the light-transmitting substrate is a glass substrate;

the first light-transmitting electrodes and the second light-transmitting electrodes are composed of an ITO film; and the multilayer film includes the niobium oxide film formed on the light-transmitting substrate and a silicon oxide film laminated on the niobium oxide film;

wherein the niobium oxide film has a thickness of 4 nm to 6 nm and a refractive index of 2.22 to 2.37;

the silicon oxide film has a thickness of 52 nm to 60 nm or 70 nm to 78 nm and a refractive index of 1.425 to 1.49; and the ITO film has a thickness of 17 nm to 23 nm and a refractive index of 1.87 to 1.945.

* * * * *